United States Patent
Tomizaki et al.

(10) Patent No.: US 8,796,369 B2
(45) Date of Patent: Aug. 5, 2014

(54) AQUEOUS BASE COATING COMPOSITION

(75) Inventors: Yasuhiro Tomizaki, Hiratsuka (JP);
Hiroyuki Onoyama, Hiratsuka (JP)

(73) Assignee: Kansai Paint Co., Ltd., Amagasaki-shi (JP)

( * ) Notice: Subject to any disclaimer, the term of this patent is extended or adjusted under 35 U.S.C. 154(b) by 775 days.

(21) Appl. No.: 11/979,307

(22) Filed: Nov. 1, 2007

(65) Prior Publication Data
US 2008/0108743 A1    May 8, 2008

(30) Foreign Application Priority Data

Nov. 2, 2006    (JP) ................................. 2006-299551

(51) Int. Cl.
*C08L 33/24* (2006.01)
*C08L 51/00* (2006.01)
*C08F 265/00* (2006.01)
*C08K 5/10* (2006.01)

(52) U.S. Cl.
CPC ............. *C08L 51/003* (2013.01); *C08F 265/00* (2013.01); *C08K 5/10* (2013.01)
USPC .......................................... 524/306; 524/523

(58) Field of Classification Search
CPC ...... C08K 5/10; C08F 265/00; C08L 51/0003
USPC ................................................. 524/306, 523
See application file for complete search history.

(56) References Cited

U.S. PATENT DOCUMENTS

| | | | | |
|---|---|---|---|---|
| 3,954,715 | A * | 5/1976 | Fang .............................. | 525/518 |
| 4,900,774 | A | 2/1990 | Mitsuji et al. .................. | 524/512 |
| 5,332,766 | A * | 7/1994 | Takaya et al. .................. | 523/201 |
| 5,539,049 | A * | 7/1996 | Kajima et al. .................. | 525/66 |
| 5,880,187 | A * | 3/1999 | Kawazu et al. ................. | 525/101 |
| 5,886,082 | A * | 3/1999 | Numa et al. .................... | 524/501 |
| 6,031,028 | A * | 2/2000 | Iino et al. ....................... | 523/412 |
| 6,177,488 | B1 * | 1/2001 | Kasari et al. ................... | 523/410 |
| 6,197,462 | B1 * | 3/2001 | Yanus et al. .................... | 430/56 |
| 6,262,144 | B1 * | 7/2001 | Zhao et al. ..................... | 523/201 |
| 6,417,277 | B1 * | 7/2002 | Tomizaki et al. ............. | 525/192 |
| 6,541,070 | B2 * | 4/2003 | Magoshi et al. ........... | 427/407.1 |
| 6,605,662 | B2 * | 8/2003 | Zhao et al. ..................... | 524/458 |
| 6,730,203 | B2 * | 5/2004 | Ikenoue et al. ................ | 204/488 |
| 6,784,236 | B2 * | 8/2004 | Sugita et al. ................... | 524/378 |
| 2002/0098375 | A1 * | 7/2002 | Sugita et al. ................... | 428/626 |
| 2003/0176568 | A1 * | 9/2003 | Onoda et al. ................... | 524/589 |
| 2006/0188656 | A1 * | 8/2006 | Katsuta et al. ............. | 427/407.1 |
| 2007/0237903 | A1 * | 10/2007 | Hiwara et al. ............. | 427/407.1 |
| 2008/0199625 | A1 * | 8/2008 | Niwa ........................ | 427/407.1 |
| 2009/0252879 | A1 * | 10/2009 | Yukawa et al. ............. | 427/372.2 |
| 2009/0280256 | A1 * | 11/2009 | Narita et al. ............... | 427/372.2 |

FOREIGN PATENT DOCUMENTS

| | | | |
|---|---|---|---|
| GB | 2 217 721 | | 11/1989 |
| JP | 55-3488 | | 1/1980 |
| JP | 55-16036 | A | 2/1980 |
| JP | 64-113 | | 1/1989 |
| JP | 07-41729 | A | 2/1995 |
| JP | 2001-240791 | * | 4/2001 |
| JP | 2001-302985 | A | 10/2001 |
| JP | 2002-30253 | A | 1/2002 |
| JP | 2002-308993 | * | 10/2002 |
| JP | 2004-073956 | | 3/2004 |
| JP | 2006-176618 | A | 7/2006 |
| JP | 2007-263937 | | 6/2007 |
| WO | WO 2006/009219 | * | 1/2006 |

OTHER PUBLICATIONS

Cytec-Cymel Amino Resin Crosslinkers for the Coating Industry. No Author, Copyright 2008. Accessed online from www.cytec.com on Mar. 24, 2011.*
English machine translation of JP 2002-308993 to Nakajima. Obtained via AIPN/JPO website on Sep. 23, 2011.*
Cytec-Cymel product data sheet. No Author, No Date. Obtained from www.allnex.com/brochures/199 on Aug. 19, 2013.*
Combined Search and Examination Report under Sections 17 and 18(3) dated Feb. 29, 2008.

* cited by examiner

*Primary Examiner* — Michael Pepitone
*Assistant Examiner* — Michael A Salvitti
(74) *Attorney, Agent, or Firm* — Kratz, Quintos & Hanson, LLP

(57) ABSTRACT

The present invention provides an aqueous base coating composition comprising (A) a hydroxy-containing resin, (B) a melamine resin with a weight average molecular weight of 1,000 to 5,000, and (C) a diester compound represented by Formula (1); and a method for forming a multilayer coating film using this aqueous base coating composition.

8 Claims, No Drawings

AQUEOUS BASE COATING COMPOSITION

TECHNICAL FIELD

The present invention relates to an aqueous base coating composition, and a method for forming a coating film using the aqueous base coating composition.

BACKGROUND ART

Topcoat compositions applied to automotive exterior panels are required to form a topcoat film with excellent coating film properties, such as distinctness of image (DOI) and water resistance.

The topcoat film is usually a multilayer coating film comprising a base coating and a clear coating.

The base coating of a topcoat film is usually formed by using a color base coating composition containing a pigment such as an effect pigment, a coloring pigment, or the like. By applying a transparent, clear coating composition over the base coating to form a multilayer coating film, the resulting topcoat film can be provided with an excellent design derived from the base coating, and also with an excellent gloss and smoothness derived from the clear coating.

Many organic solvent-based base coating compositions have been used as base coating compositions. However, when such a base coating composition is used, an organic solvent vaporizes when the coating is baked, thereby causing an environmental problem, i.e., pollution. Recently, the use of less pollutant aqueous base coating compositions has been increasing. As such aqueous base coating compositions, compositions prepared by incorporating a melamine resin as a crosslinking agent into an acrylic, polyester or like resin having a functional group such as hydroxy, carboxy, etc., have often been used.

Many water-soluble melamine resins that have a comparatively low molecular weight and are highly compatible with water have been used as melamine resins in such aqueous base coating compositions. Recently, the use of hydrophobic melamine resins having a comparatively high molecular weight has been considered. Compared with aqueous base coating compositions comprising a water-soluble melamine resin, aqueous base coating compositions comprising a hydrophobic melamine resin can form a coating film with excellent coating properties, such as water resistance. However, hydrophobic melamine resins are poorly compatible with water, which is the coating composition medium. Therefore, when such a hydrophobic melamine resin is used, the obtained coating film may have poor DOI. Furthermore, when the composition comprises an effect pigment such as aluminum flakes, mica, etc., metallic unevenness may occur in the film.

Japanese Unexamined Patent Publication No. 2002-308993 discloses an aqueous resin dispersion with excellent water dispersion stability, comprising a reaction product obtained by subjecting an acrylic resin, a hydrophobic melamine resin, and a polyester resin to a heat treatment. The publication describes that this dispersion can form a coating film with an excellent coating appearance. However, since production of the aqueous resin dispersion requires a heating step, it is disadvantageous in terms of energy savings. Furthermore, when the aqueous dispersion is used, metallic unevenness may occur in the obtained coating film.

U.S. Pat. No. 4,900,774 discloses an aqueous coating composition comprising a crosslinking agent prepared by dispersing a hydrophobic melamine resin in water in the presence of a water-soluble resin. The patent describes that this composition has excellent storage stability and the use of the composition enables appropriate coating work to be performed in a wide range of humidities, without causing defects such as sagging and unevenness. However, coating films formed using the aqueous coating composition may have poor DOI and poor water resistance.

U.S. Pat. No. 5,539,049 discloses an aqueous resin dispersion prepared by dispersing a graft resin and a hydrophobic melamine resin in an aqueous medium, the graft resin having a hydrophilic side chain moiety with a weight average molecular weight of 5,000 to 50,000 and an acid value of at least 20. The patent describes that this dispersion is excellent in terms of storage stability, thermal stability, mechanical stability, etc. However, when an aqueous base coating composition comprising this aqueous resin dispersion is used, the obtained coating film may have poor DOI and poor water resistance and metallic unevenness may occur in the coating film.

Examples of methods for forming a multilayer topcoat film comprising a base coating and a clear coating include a two-coat one-bake method comprising applying a clear coating composition over an uncured base coating, and baking to cure the base coating and the clear coating at the same time; and a two-coat two-bake method comprising baking to cure a base coating, then applying a clear coating composition over the base coating, and baking to cure the clear coating. Currently, the two-coat one-bake method is widely used in view of energy savings, etc. However, according to the two-coat one-bake method, since a clear coating composition is applied over an uncured base coating, a mixed layer is generated at the interface between the base coating and clear coating, so that the obtained coating film may have poor DOI. Another problem is that metallic unevenness is likely to occur in the coating film.

Japanese Unexamined Patent Publication No. 2004-73956 discloses using an aqueous base coating composition containing a specific tertiary amine, thus providing a multilayer coating film with excellent appearance and water resistance. However, when this method is used, metallic unevenness may occur in the obtained coating film.

DISCLOSURE OF THE INVENTION

An object of the present invention is to provide an aqueous base coating composition optionally comprising an effect pigment, the composition being capable of forming a coating film having excellent DOI and excellent water resistance, and also having little metallic unevenness when the composition comprises an effect pigment; and a method for forming a multilayer coating film.

Another object of the present invention is to provide an aqueous base coating composition that can be used in a two-coat one-bake method for forming a multilayer coating film to inhibit the formation of a mixed layer of the base coating and clear coating and thereby provide a multilayer coating film with excellent DOI and little metallic unevenness; and a method for forming a multilayer coating film.

To achieve the above objects, the present inventors carried out extensive research. As a result, the inventors found that an aqueous base coating composition comprising a specific compound can achieve the above objects. The present invention has been accomplished, based on this finding.

The present invention provides the following aqueous base coating compositions and methods for forming multilayer coating films using the aqueous base coating compositions.

1. An aqueous base coating composition comprising
(A) a hydroxy-containing resin, (B) a melamine resin with a weight average molecular weight of 1,000 to 5,000, and
(C) a diester compound represented by Formula (1)

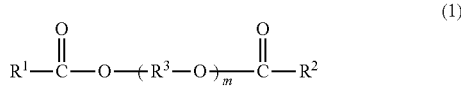

wherein $R^1$ and $R^2$ independently represent a $C_{4-18}$ hydrocarbon group, $R^3$ represents a $C_{2-4}$ alkylene group, m represents an integer of 3 to 25, and the $R^3$'s may be the same or different.

2. An aqueous base coating composition according to item 1 wherein the hydroxy-containing resin (A) is a core-shell-type water-dispersible acrylic resin (A1') comprising:
a core copolymer (I) consisting of 0.1 to 30 mass % of a polymerizable unsaturated monomer (b) having two or more polymerizable unsaturated groups per molecule, and 70 to 99.9 mass % of a polymerizable unsaturated monomer (c) having one polymerizable unsaturated group per molecule as monomer components; and
a shell copolymer (II) consisting of 1 to 35 mass % of a hydroxy-containing polymerizable unsaturated monomer (a), 5 to 60 mass % of a hydrophobic polymerizable unsaturated monomer (d), and 5 to 94 mass % of other polymerizable unsaturated monomer(s) (e) as monomer components;
and the solids mass ratio of copolymer (I) to copolymer (II) is in the range of 10/90 to 90/10.

3. An aqueous base coating composition according to item 2 wherein the polymerizable unsaturated monomer (b) is an amide group-containing monomer.

4. An aqueous base coating composition according to item 1 wherein the hydroxy-containing resin (A) is a hydroxy-containing polyester resin (A2).

5. An aqueous base coating composition according to item 1 wherein the proportion of the hydroxy-containing resin (A) to the melamine resin (B) is 30 to 95 mass % of the former to 5 to 70 mass % of the latter, based on the total mass of both the resins.

6. An aqueous base coating composition according to item 1 wherein the proportion of the diester compound (C) is 1 to 30 parts by mass, based on 100 parts by mass of the total of the hydroxy-containing resin (A) and the melamine resin (B).

7. An aqueous base coating composition according to item 1 further comprising a hydrophobic solvent (D).

8. An aqueous base coating composition according to item 1 further comprising an effect pigment (E).

9. An article coated with the aqueous base coating composition of item 1.

10. A method for forming a multilayer coating film comprising:
(1) a step of applying the aqueous base coating composition of item 1 to a substrate to form a base coating;
(2) a step of applying a clear coating composition to the uncured base coating surface to form a clear coating;
(3) a step of heating the uncured base coating and the uncured clear coating to cure the coatings at the same time.

11. An article coated using the method of item 10.

The aqueous base coating composition and the method for forming a multilayer coating film according to the present invention are described below in detail.

The aqueous base coating composition of the invention comprises (A) a hydroxy-containing resin, (B) a melamine resin having a weight average molecular weight of 1,000 to 5,000, and (C) a specific diester compound.

(A) Hydroxy-Containing Resin

The hydroxy-containing resin (A) is a resin having at least one hydroxy group per molecule. Kinds of usable resins include, for example, polyester resins, acrylic resins, polyether resins, polycarbonate resins, polyurethane resins, epoxy resins, alkyd resins, etc. The resin (A) may further contain a carboxy group. At least one resin selected from the group consisting of hydroxy-containing acrylic resins (A1) and hydroxy-containing polyester resins (A2) is preferably used as the resin (A).

When the hydroxy-containing resin (A) is a hydroxy-containing acrylic resin (A1) or a hydroxy-containing polyester resin (A2), the resin may be a urethane-modified acrylic resin or urethane-modified polyester resin prepared by subjecting some of the hydroxy groups in the resin and a polyisocyanate compound to a urethanization reaction for chain-lengthening and forming a high-molecular-weight resin.

Hydroxy-Containing Acrylic Resin (A1)

The hydroxy-containing acrylic resin (A1) can be produced by copolymerizing or polymerizing a polymerizable unsaturated monomer component comprising a hydroxy-containing polymerizable unsaturated monomer (a) using a known method, such as solution polymerization in an organic solvent, or emulsion polymerization in water.

The hydroxy-containing polymerizable unsaturated monomer (a) is a compound containing at least one hydroxy group and at least one polymerizable unsaturated bond per molecule. Examples of the monomer (a) include mono-esterified products of (meth)acrylic acid with a dihydric alcohol having 2 to 8 carbon atoms, such as 2-hydroxyethyl(meth)acrylate, 2-hydroxypropyl(meth)acrylate, 3-hydroxypropyl(meth)acrylate, 4-hydroxybutyl(meth)acrylate, etc.; ε-caprolactone-modified products of the monoesterified products of (meth)acrylic acid with a dihydric alcohol containing 2 to 8 carbon atoms; N-hydroxymethyl(meth)acrylamide; allyl alcohol; (meth)acrylates having hydroxy-terminated polyoxyethylene chains; etc. Such monomers (a) can be used singly or in a combination of two or more.

Examples of other polymerizable unsaturated monomers that can be copolymerized with the hydroxy-containing polymerizable unsaturated monomer (a) are listed below in (i) to (xix). Such monomers can be used singly or in a combination of two or more.

(i) Alkyl or cycloalkyl(meth)acrylates: methyl(meth)acrylate, ethyl(meth)acrylate, n-propyl(meth)acrylate, i-propyl(meth)acrylate, n-butyl(meth)acrylate, i-butyl(meth)acrylate, tert-butyl(meth)acrylate, n-hexyl(meth)acrylate, n-octyl(meth)acrylate, 2-ethylhexyl(meth)acrylate, nonyl(meth)acrylate, tridecyl(meth)acrylate, lauryl(meth)acrylate, stearyl(meth)acrylate, "Isostearyl Acrylate" (tradename of Osaka Organic Chemical Industry, Ltd.), cyclohexyl(meth)acrylate, methylcyclohexyl(meth)acrylate, t-butylcyclohexyl(meth)acrylate, cyclododecyl(meth)acrylate, tricyclodecanyl(meth)acrylate, etc.

(ii) Isobornyl-containing polymerizable unsaturated monomers: isobornyl(meth)acrylate, etc.

(iii) Adamantyl-containing polymerizable unsaturated monomers: adamantyl(meth)acrylate, etc.

(iv) Tricyclodecenyl-containing polymerizable unsaturated monomers: tricyclodecenyl(meth)acrylate, etc.

(v) Aromatic ring-containing polymerizable unsaturated monomers: styrene, α-methylstyrene, vinyltoluene, benzyl(meth)acrylate, etc.

(vi) Alkoxysilyl-containing polymerizable unsaturated monomers: vinyltrimethoxysilane, vinyltriethoxysilane, vinyltris(2-methoxyethoxy)silane, γ-(meth)acryloyloxypropyltrimethoxysilane, γ-(meth)acryloyloxypropyltriethoxysilane, etc.

(vii) Fluorinated alkyl-containing polymerizable unsaturated monomers: perfluorobutylethyl(meth)acrylate, perfluorooctylethyl(meth)acrylate, and like perfluoroalkyl(meth)acrylates; fluoroolefins; etc.

(viii) Polymerizable unsaturated monomers having photopolymerizable functional groups such as a maleimide group.

(ix) Vinyl compounds: N-vinylpyrrolidone, ethylene, butadiene, chloroprene, vinyl propionate, vinyl acetate, etc.

(x) Carboxy-containing polymerizable unsaturated monomers: (meth)acrylic acid, maleic acid, crotonic acid, β-carboxyethyl acrylate, etc.

(xi) Nitrogen-containing polymerizable unsaturated monomers: (meth)acrylonitrile, (meth)acrylamide, N,N-dimethylaminoethyl(meth)acrylate, N,N-diethylaminoethyl(meth)acrylate, N,N-dimethylaminopropyl(meth)acrylamide, methylene bis(meth)acrylamide, ethylene bis(meth)acrylamide, dimethylaminoethyl(meth)acrylate, adducts of glycidyl(meth)acrylate with amines, etc.

(xii) Polymerizable unsaturated monomers having two or more polymerizable unsaturated groups per molecule: allyl(meth)acrylate, 1,6-hexanediol di(meth)acrylate, etc.

(xiii) Epoxy-containing polymerizable unsaturated monomers: glycidyl(meth)acrylate, β-methylglycidyl(meth)acrylate, 3,4-epoxycyclohexylmethyl(meth)acrylate, 3,4-epoxycyclohexylethyl(meth)acrylate, 3,4-epoxycyclohexylpropyl(meth)acrylate, allyl glycidyl ether, etc.

(xiv) (Meth)acrylates having alkoxy-terminated polyoxyethylene chains.

(xv) Sulfonic acid group-containing polymerizable unsaturated monomers: 2-acrylamide-2-methylpropanesulfonic acid, 2-sulfoethyl(meth)acrylate, allylsulfonic acid, 4-styrenesulfonic acid, etc.; sodium salts and ammonium salts of such sulfonic acids; etc.

(xvi) Phosphoric acid group-containing polymerizable unsaturated monomers: 2-acryloyloxyethyl acid phosphate, 2-methacryloyloxyethyl acid phosphate, 2-acryloyloxypropyl acid phosphate, 2-methacryloyloxypropyl acid phosphate, acid phosphooxypolyoxyethylene glycol mono(meth)acrylate, acid phosphooxypolyoxypropylene glycol mono(meth)acrylate, etc.

(xvii) Polymerizable unsaturated monomers having UV-absorbing functional groups: 2-hydroxy-4-(3-methacryloyloxy-2-hydroxypropoxy)benzophenone, 2-hydroxy-4-(3-acryloyloxy-2-hydroxypropoxy)benzophenone, 2,2'-dihydroxy-4-(3-methacryloyloxy-2-hydroxypropoxy)benzophenone, 2,2'-dihydroxy-4-(3-acryloyloxy-2-hydroxypropoxy)benzophenone, 2-(2'-hydroxy-5'-methacryloyloxyethylphenyl)-2H-benzotriazole, etc.

(xviii) UV-stable polymerizable unsaturated monomers: 4-(meth)acryloyloxy-1,2,2,6,6-pentamethylpiperidine, 4-(meth)acryloyloxy-2,2,6,6-tetramethylpiperidine, 4-cyano-4-(meth)acryloylamino-2,2,6,6-tetramethylpiperidine, 1-(meth)acryloyl-4-(meth)acryloylamino-2,2,6,6-tetramethylpiperidine, 1-(meth)acryloyl-4-cyano-4-(meth)acryloylamino-2,2,6,6-tetramethylpiperidine, 4-crotonoyloxy-2,2,6,6-tetramethylpiperidine, 4-crotonoylamino-2,2,6,6-tetramethylpiperidine, 1-chrotonoyl-4-crotonoyloxy-2,2,6,6-tetramethylpiperidine, etc.

(xix) Carbonyl-containing polymerizable unsaturated monomers: acrolein, diacetone acrylamide, diacetone methacrylamide, acetoacetoxyethyl methacrylate, formylstyrol, $C_{4-7}$ vinyl alkyl ketones (e.g., vinyl methyl ketone, vinyl ethyl ketone, vinyl butyl ketone), etc.

In this specification, the term "(meth)acrylate" refers to "acrylate or methacrylate". The term "(meth)acrylic acid" refers to "acrylic acid or methacrylic acid". The term "(meth)acryloyl" refers to "acryloyl or methacryloyl". The term "(meth)acrylamide" refers to "acrylamide or methacrylamide".

The hydroxy-containing acrylic resin (A1) preferably has an amide group. The hydroxy-containing acrylic resin having an amide group can be produced by using an amide group-containing unsaturated monomer, such as (meth)acrylamide, N,N-dimethylaminopropyl(meth)acrylamide, or the like, as other polymerizable unsaturated monomer(s) copolymerizable with the hydroxy-containing polymerizable unsaturated monomer (a).

The amount of hydroxy-containing polymerizable unsaturated monomer (a) used to produce the hydroxy-containing acrylic resin (A1) is preferably about 1 to about 50 mass %, more preferably about 2 to about 40 mass %, and even more preferably about 3 to about 30 mass %, based on the total mass of the monomer (a) and other polymerizable monomer(s) copolymerizable with the monomer (a).

To provide the coating composition with excellent storage stability and obtain a coating film with excellent water resistance, etc., the hydroxy-containing acrylic resin (A1) preferably has an acid value of about 0.1 to 200 mg KOH/g, more preferably about 2 to about 150 mg KOH/g, and even more preferably about 5 to about 100 mg KOH/g.

To obtain a coating film with excellent water resistance, etc., the hydroxy-containing acrylic resin (A1) preferably has a hydroxy value of about 0.1 to 200 mg KOH/g, more preferably about 2 to about 150 mg KOH/g, and even more preferably about 5 to about 100 mg KOH/g.

To obtain a coating film with excellent smoothness, etc., the hydroxy-containing acrylic resin (A1) preferably has a weight average molecular weight of about 3,000 to about 300,000, more preferably about 4,000 to about 200,000, and even more preferably about 6,000 to about 150,000.

To obtain a coating film with excellent DOI and water resistance, the hydroxy-containing acrylic resin (A1) is preferably a core-shell-type water-dispersible acrylic resin (A1') comprising: a core copolymer (I) consisting of 0.1 to 30 mass % of a polymerizable unsaturated monomer (b) having two or more polymerizable unsaturated groups per molecule and 70 to 99.9 mass % of a polymerizable unsaturated monomer (c) having one polymerizable unsaturated group per molecule as monomer components; and a shell copolymer (II) consisting of 1 to 35 mass % of a hydroxy-containing polymerizable unsaturated monomer (a), 5 to 60 mass % of a hydrophobic polymerizable unsaturated monomer (d), and 5 to 94 mass % of other polymerizable unsaturated monomer(s) (e) as monomer components; and the solids mass ratio of the core copolymer (I) to shell copolymer (II) is preferably in the range of 10/90 to 90/10.

In this specification, the term "polymerizable unsaturated group" refers to "an unsaturated group that can be radically polymerized". Examples of such polymerizable unsaturated groups include vinyl, (meth)acryloyl, etc.

Examples of the monomer (b) include allyl(meth)acrylate, ethylene glycol di(meth)acrylate, triethylene glycol di(meth)acrylate, tetraethylene glycol di(meth)acrylate, 1,3-butylene glycol di(meth)acrylate, trimethylol propane tri(meth)acrylate, 1,4-butanediol di(meth)acrylate, neopentyl glycol di(meth)acrylate, 1,6-hexanediol di(meth)acrylate, pentaerythritol di(meth)acrylate, pentaerythritol tetra(meth)acrylate, glycerol di(meth)acrylate, 1,1,1-tris-hydroxymethylethane di(meth)acrylate, 1,1,1-tris-hydroxymethylethane tri(meth)acrylate, 1,1,1-tris-hydroxymethylpropane tri (meth)acrylate, triallyl isocyanurate, diallyl terephthalate, divinylbenzene, etc. Such monomers can be used singly or in a combination of two or more.

The monomer (b) functions to provide a crosslinked structure to the core copolymer (I). The amount of monomer (b) can be suitably selected according to the desired degree of crosslinking of the core copolymer (I). Usually, the amount is preferably about 0.1 to about 30 mass %, more preferably about 0.5 to about 10 mass %, and even more preferably about 1 to about 7 mass %, based on the total mass of the monomers (b) and (c).

To obtain a coating film with excellent appearance, the monomer (b) is preferably an amide group-containing monomer, such as methylene bis(meth)acrylamide, ethylene bis(meth)acrylamide, etc. When such an amide group-containing monomer is used, the amount thereof is preferably about 0.1 to about 25 mass %, more preferably about 0.5 to about 9 mass %, and even more preferably about 1 to about 4 mass %, based on the total mass of the monomers (b) and (c).

The polymerizable unsaturated monomer (c) used as a monomer for the core copolymer (I) is a polymerizable unsaturated monomer that can be copolymerized with a polymerizable unsaturated monomer having two or more polymerizable unsaturated monomers per molecule.

Specific examples of the monomer (c) include alkyl or cycloalkyl(meth)acrylates, such as methyl(meth)acrylate, ethyl(meth)acrylate, n-propyl(meth)acrylate, i-propyl(meth)acrylate, n-butyl(meth)acrylate, i-butyl(meth)acrylate, tert-butyl(meth)acrylate, n-hexyl(meth)acrylate, n-octyl(meth)acrylate, 2-ethylhexyl(meth)acrylate, nonyl(meth)acrylate, tridecyl(meth)acrylate, lauryl(meth)acrylate, stearyl(meth)acrylate, "Isostearyl Acrylate" (tradename of Osaka Organic Chemical Industry, Ltd.), cyclohexyl(meth)acrylate, methylcyclohexyl(meth)acrylate, t-butylcyclohexyl(meth)acrylate, cyclododecyl(meth)acrylate, tricyclodecanyl(meth)acrylate, etc.; isobornyl-containing polymerizable unsaturated monomers, such as isobornyl(meth)acrylate, etc.; adamantly-containing polymerizable unsaturated monomers, such as adamantyl(meth)acrylate, etc.; tricyclodecenyl-containing polymerizable unsaturated monomers, such as tricyclodecenyl(meth)acrylate, etc.; aromatic ring-containing polymerizable unsaturated monomers, such as styrene, 1-methyl styrene, vinyltoluene, benzyl(meth)acrylate, etc.; alkoxysilyl-containing polymerizable unsaturated monomers, such as vinyltrimethoxysilane, vinyltriethoxysilane, vinyltris(2-methoxyethoxy)silane, γ-(meth)acryloyloxypropyltrimethoxysilane, and γ-(meth)acryloyloxypropyltriethoxysilane, etc.; perfluoroalkyl(meth)acrylates, such as perfluorobutylethyl(meth)acrylate, perfluorooctylethyl(meth)acrylate, etc.; polymerizable unsaturated monomers having fluorinated alkyl groups, such as fluoroolefin, etc.; polymerizable unsaturated monomers having photopolymerizable functional groups, such as a maleimide group, etc.; vinyl compounds, such as N-vinylpyrrolidone, ethylene, butadiene, chloroprene, vinyl propionate, vinyl acetate, etc.; hydroxy-containing polymerizable unsaturated monomers, such as monoesterified products of (meth)acrylic acid with a dihydric alcohol containing 2 to 8 carbon atoms (e.g., 2-hydroxyethyl(meth)acrylate, 2-hydroxypropyl(meth)acrylate, 3-hydroxypropyl(meth)acrylate, 4-hydroxybutyl(meth)acrylate, etc.); ε-caprolactone-modified products of the monoesterified products of (meth)acrylic acid with a dihydric alcohol containing 2 to 8 carbon atoms, N-hydroxymethyl(meth)acrylamide, allyl alcohol, (meth)acrylate having a polyoxyethylene chain with a terminal hydroxy group, etc.; carboxy-containing polymerizable unsaturated monomers, such as (meth)acrylic acid, maleic acid, crotonic acid, β-carboxyethylacrylate, etc.; nitrogen-containing polymerizable unsaturated monomers, such as (meth)acrylonitrile, (meth)acrylamide, N,N-dimethylaminoethyl(meth)acrylate, N,N-diethylaminoethyl(meth)acrylate, N,N-dimethylaminopropyl(meth)acrylamide, addition products of an amine with glycidyl(meth)acrylate, etc.; epoxy-containing polymerizable unsaturated monomers, such as glycidyl(meth)acrylate, β-methylglycidyl(meth)acrylate, 3,4-epoxycyclohexylmethyl(meth)acrylate, 3,4-epoxycyclohexylethyl(meth)acrylate, 3,4-epoxycyclohexylpropyl(meth)acrylate, allyl glycidyl ether, etc.; (meth)acrylates having alkoxy-terminated polyoxyethylene chains, etc. Such monomers can be used singly or in a combination of two or more according to the properties required of the core-shell-type water-dispersible hydroxy-containing acrylic resin.

Examples of the monomer (a) include monoesterified products of (meth)acrylic acid with a dihydric alcohol containing 2 to 8 carbon atoms, such as 2-hydroxyethyl(meth)acrylate, 2-hydroxypropyl(meth)acrylate, 3-hydroxypropyl(meth)acrylate, 4-hydroxybutyl(meth)acrylate, etc.; ε-caprolactone-modified products of the monoesterified products of (meth)acrylic acid with a dihydric alcohol containing 2 to 8 carbon atoms; N-hydroxymethyl(meth)acrylamide, allyl alcohol, (meth)acrylates having hydroxy-terminated polyoxyethylene chains, etc. Such monomers can be used singly or in a combination of two or more.

To provide the core-shell water-dispersible acrylic resin with excellent stability in an aqueous medium and obtain a coating film with excellent water resistance, the amount of monomer (a) is preferably about 1 to about 35 mass %, and more preferably about 6 to about 25 mass %, and even more preferably about 7 to about 19 mass %, based on the total mass of the monomers constituting the shell copolymer (II).

The monomer (d) used as a monomer for the shell copolymer (II) is a polymerizable unsaturated monomer containing a linear, branched, or cyclic, saturated or unsaturated hydrocarbon group containing 6 or more carbon atoms, excluding monomers containing a hydrophilic group, such as hydroxy-containing polymerizable unsaturated monomers. Examples of such monomers include alkyl or cycloalkyl(meth)acrylates such as N-hexyl(meth)acrylate, n-octyl(meth)acrylate, 2-ethylhexyl(meth)acrylate, nonyl(meth)acrylate, tridecyl(meth)acrylate, lauryl(meth)acrylate, stearyl(meth)acrylate, "Isostearyl Acrylate" (tradename of Osaka Organic Chemical Industry, Ltd.), cyclohexyl(meth)acrylate, methylcyclohexyl(meth)acrylate, t-butylcyclohexyl(meth)acrylate, cyclododecyl(meth)acrylate, tricyclodecanyl(meth)acrylate; isobornyl-containing polymerizable unsaturated monomers such as isobornyl(meth)acrylate, etc.; adamantyl-containing polymerizable unsaturated monomers such as adamantyl(meth)acrylate, etc.; and aromatic ring-containing polymerizable unsaturated monomers such as styrene, α-methyl styrene, vinyltoluene, benzyl(meth)acrylate etc. Such monomers can be used singly or in a combination of two or more.

To obtain a coating film with enhanced DOI, the monomer (d) is preferably a $C_{6-18}$ alkyl-containing polymerizable unsaturated monomer and/or an aromatic ring-containing polymerizable unsaturated monomer. Styrene is particularly preferable.

In view of the excellent stability of the core-shell water-dispersible acrylic resin in an aqueous medium and the excellent water resistance of the obtained coating film, the amount of monomer (d) is preferably about 5 to about 60 mass %, more preferably about 7 to about 40 mass %, and even more preferably about 9 to about 25 mass %, based on the total mass of the monomers constituting the shell copolymer (II).

When styrene is used as the monomer (d), the amount thereof is preferably about 5 to about 50 mass %, more preferably about 7 to about 30 mass %, and even more preferably about 9 to about 20 mass %, based on the total mass of the monomers constituting the shell copolymer (II).

The monomer (e) used as a monomer for the shell copolymer (II) is a polymerizable unsaturated monomer other than the monomers (a) and (d). Examples of such monomers include alkyl or cycloalkyl(meth)acrylates, such as methyl (meth)acrylate, ethyl(meth)acrylate, n-propyl(meth)acrylate, i-propyl(meth)acrylate, n-butyl(meth)acrylate, i-butyl(meth)acrylate, tert-butyl(meth)acrylate, etc.; carboxy-containing polymerizable unsaturated monomers; etc. Such monomers can be used singly or in a combination of two or more.

Specific examples of carboxy-containing polymerizable unsaturated monomers for the shell copolymer (II) are the same as mentioned as examples of carboxy-containing polymerizable unsaturated monomers for the core copolymer (I). It is particularly preferable to use acrylic acid and/or methacrylic acid as the carboxy-containing polymerizable unsaturated monomer. By using a carboxy-containing polymerizable unsaturated monomer as the monomer (e), the obtained core-shell-type water-dispersible acrylic resin is provided with excellent stability in an aqueous medium.

To provide the coating composition with excellent stability and obtain a coating film with excellent water resistance, the amount of carboxy-containing polymerizable unsaturated monomer, when used, is preferably about 1 to about 40 mass %, more preferably about 6 to about 25 mass %, and even more preferably about 7 to about 19 mass %, based on the total mass of the monomers constituting the shell copolymer (II).

To obtain a coating film with excellent appearance, it is preferable that a polymerizable unsaturated monomer having at least two polymerizable unsaturated groups per molecule is not used as the monomer (e) and the shell copolymer (II) is an uncrosslinked copolymer.

To obtain a coating film with excellent appearance, the mass ratio of copolymer (I) to copolymer (II) in the core-shell-type water-dispersible acrylic resin (A1') is preferably in the range of about 10/90 to about 90/10, more preferably about 50/50 to about 85/15, and even more preferably about 65/35 to about 80/20, on a solids basis.

To obtain a coating film with excellent water resistance, etc., the core-shell-type water-dispersible acrylic resin (A1') preferably has a hydroxy value of about 1 to about 70 mg KOH/g, more preferably about 2 to about 50 mg KOH/g, and even more preferably about 5 to about 30 mg KOH/g.

To provide the coating composition with excellent storage stability and obtain a coating film with excellent water resistance, etc., the core-shell-type water-dispersible acrylic resin (A1') preferably has an acid value of about 5 to about 90 mg KOH/g, more preferably about 8 to about 50 mg KOH/g, and even more preferably about 10 to about 35 mg KOH/g.

The core-shell-type water-dispersible acrylic resin (A1') can be prepared by a process comprising: subjecting to emulsion polymerization a monomer mixture of about 0.1 to about 30 mass % of a monomer (b) and about 70 to about 99.9 mass % of a monomer (c) to form an emulsion of a core copolymer (I); adding to this emulsion a monomer mixture of about 1 to about 35 mass % of a monomer (a), about 5 to about 60 mass % of a monomer (d), and about 5 to about 94 mass % of a monomer (e), and further performing emulsion polymerization to form a shell copolymer (II).

The emulsion polymerization for preparing an emulsion of core copolymer (I) can be carried out according to a known method. For example, the emulsion can be prepared by subjecting the monomer mixture to emulsion polymerization in the presence of an emulsifier using a polymerization initiator.

The emulsifier is preferably an anionic emulsifier or a nonionic emulsifier. Examples of anionic emulsifiers include sodium salts and ammonium salts of alkylsulfonic acids, alkylbenzenesulfonic acids, alkylphosphoric acids, etc. Examples of nonionic emulsifiers include polyoxyethylene oleyl ether, polyoxyethylene stearyl ether, polyoxyethylene lauryl ether, polyoxyethylene tridecyl ether, polyoxyethylene phenyl ether, polyoxyethylene nonylphenyl ether, polyoxyethylene octylphenyl ether, polyoxyethylene monolaurate, polyoxyethylene monostearate, polyoxyethylene monooleate, sorbitan monolaurate, sorbitan monostearate, sorbitan trioleate, polyoxyethylene sorbitan monolaurate, etc.

Other examples of usable emulsifiers include polyoxyalkylene-containing anionic emulsifiers that have an anionic group and a polyoxyalkylene group, such as polyoxyethylene or polyoxypropylene, per molecule; and reactive anionic emulsifiers that have an anionic group and a radically polymerizable unsaturated group per molecule. Among these, reactive anionic emulsifiers are preferable.

Examples of reactive anionic emulsifiers include sodium salts of sulfonic acid compounds having a radically polymerizable unsaturated group, such as (meth)allyl, (meth)acryloyl, propenyl, butenyl or the like, ammonium salts of such sulfonic acid compounds, etc. Among these, ammonium salts of sulfonic acid compounds having a radically polymerizable unsaturated group are preferable in view of the excellent water resistance of the obtained coating film. Commercially available ammonium salts of such sulfonic acid compounds include "LATEMULS-180A" (tradename of Kao Corporation), etc.

Among the ammonium salts of sulfonic acid compounds having a radically polymerizable unsaturated group, ammonium salts of sulfonic acid compounds having a radically polymerizable unsaturated group and a polyoxyalkylene group are particularly preferable. Commercially available ammonium salts of sulfonic acid compounds having a radically polymerizable unsaturated group and a polyoxyalkylene group include "Aqualon KH-10" (tradename of Dai-ichi Kogyo Seiyaku Co., Ltd.), "SR-1025A" (tradename of ADEKA Co., Ltd.), etc.

The amount of emulsifier used is preferably about 0.1 to about 15 mass %, more preferably about 0.5 to about 10 mass %, and even more preferably about 1 to about 5 mass %, based on the total mass of the monomers used.

Examples of polymerization initiators include organic peroxides such as benzoyl peroxide, octanoyl peroxide, lauroyl peroxide, stearoyl peroxide, cumene hydroperoxide, tert-butyl peroxide, tert-butyl peroxylaurate, tert-butyl peroxyisopropylcarbonate, tert-butyl peroxyacetate, diisopropylbenzene hydroperoxide, etc.; azo compounds such as azobisisobutyronitrile, azobis(2,4-dimethylvaleronitrile), azobis(2-methylpropionenitrile), azobis(2-methylbutyronitrile), 4,4'-azobis(4-cyanobutanoic acid), dimethyl azobis(2-methyl propionate), azobis(2-methyl-N-(2-hydroxyethyl)-propionamide), azobis(2-methyl-N-(2-(1-hydroxy butyl))-propionamide), etc.; persulfates such as potassium persulfate, ammonium persulfate, sodium persulfate, etc.; and the like. Such polymerization initiators can be used singly or in a combination of two or more. Redox initiators prepared by combining a polymerization initiator as mentioned above with a reducing agent such as sugar, sodium formaldehyde sulfoxylate, iron complex, etc. may also be used.

Usually, the amount of polymerization initiator is preferably about 0.1 to about 5 mass %, and more preferably about 0.2 to about 3 mass %, based on the total mass of all the monomers used. The method of adding the polymerization initiator is not particularly limited, and can be suitably selected according to the kind, amount, etc. of the polymerization initiator used. For example, the polymerization initiator may be incorporated into a monomer mixture or an aqueous medium beforehand, or may be added dropwise or all at once at the time of polymerization.

The core-shell-type water-dispersible acrylic resin (A1') can be obtained by adding to the above-obtained emulsion of the core copolymer (I) a monomer mixture of the monomers (a), (d), and (e), and further performing polymerization to form a shell copolymer (II).

The monomer mixture for forming the shell copolymer (II) may optionally contain other components such as polymerization initiators as mentioned above, chain transfer agents, reducing agents, and emulsifiers, etc.

Although the monomer mixture may be added dropwise as is, it is preferably added dropwise as a monomer emulsion prepared by dispersing the monomer mixture into an aqueous medium. In this case, the particle size of the monomer emulsion is not particularly limited.

The method for polymerizing the monomer mixture for forming the shell copolymer (II) comprises, for example, adding the monomer mixture or emulsion thereof dropwise to the emulsion of the core copolymer (I) all at once or gradually, and heating to a suitable temperature while stirring.

The core-shell-type water-dispersible acrylic resin (A1') thus obtained has a multiple-layer structure comprising a core copolymer (I) of a monomer mixture of the monomers (b) and (c), and a shell copolymer (II) of a monomer mixture of the monomers (a), (d) and (e).

The core-shell-type water-dispersible acrylic resin (A1') thus obtained usually has a mean particle size of about 10 to about 1,000 nm, and particularly about 20 to about 500 nm.

In this specification, the mean particle size of the core-shell-type water-dispersible acrylic resin (A1') refers to a value obtained by measurement at 20° C. using a submicron particle size distribution analyzer after dilution with deionized water according to a usual method. For example, "COULTER N4" (tradename of Beckman Coulter, Inc.) can be used as the submicron particle size distribution analyzer.

To improve the mechanical stability of the particles of the core-shell-type water-dispersible acrylic resin (A1'), acidic groups such as carboxy groups of the water-dispersible acrylic resin (A1') are preferably neutralized with a neutralizing agent. Any neutralizing agent that can neutralize acidic groups can be used. Examples of the neutralizing agent include sodium hydroxide, potassium hydroxide, trimethylamine, 2-(dimethylamino)ethanol, 2-amino-2-methyl-1-propanol, triethylamine, aqueous ammonia, etc. The neutralizing agent is preferably used in an amount such that the pH of an aqueous dispersion of the neutralized water-dispersible acrylic resin is about 6.5 to about 9.0.

Hydroxy-Containing Polyester Resin (A2)

In the coating composition of the invention, use of a hydroxy-containing polyester resin (A2) as the hydroxyl-containing resin (A) improves the smoothness of the obtained coating film.

The hydroxy-containing polyester resin (A2) can usually be produced by an esterification reaction or transesterification reaction of an acid component with an alcohol component.

The acid component may be a compound that is conventionally used as an acid component for producing a polyester resin. Examples of such acid components include aliphatic polybasic acids, alicyclic polybasic acids, aromatic polybasic acids, etc.

Generally, aliphatic polybasic acids are aliphatic compounds having at least two carboxy groups per molecule; anhydrides of such aliphatic compounds; and esters of such aliphatic compounds. Examples of aliphatic polybasic acids include succinic acid, glutaric acid, adipic acid, pimelic acid, suberic acid, azelaic acid, sebacic acid, undecanedioic acid, dodecanedioic acid, brassylic acid, octadecanedioic acid, citric acid, and like aliphatic polycarboxylic acids; anhydrides of such aliphatic polycarboxylic acids; esters of such aliphatic polycarboxylic acids with about $C_1$ to about $C_4$ lower alkyls; etc. Such aliphatic polybasic acids can be used singly or in a combination of two or more.

In view of the smoothness of the obtained coating film, it is particularly preferable to use adipic acid and/or adipic anhydride as an aliphatic polybasic acid.

Generally, alicyclic polybasic acids are compounds having at least one alicyclic structure and at least two carboxy groups per molecule; acid anhydrides of such compounds; and esters of such compounds. The alicyclic structure is mainly a 4- to 6-membered ring structure. Examples of alicyclic polybasic acids include 1,2-cyclohexanedicarboxylic acid, 1,3-cyclohexanedicarboxylic acid, 1,4-cyclohexanedicarboxylic acid, 4-cyclohexene-1,2-dicarboxylic acid, 3-methyl-1,2-cyclohexanedicarboxylic acid, 4-methyl-1,2-cyclohexanedicarboxylic acid, 1,2,4-cyclohexanetricarboxylic acid, 1,3,5-cyclohexanetricarboxylic acid, and like alicyclic polycarboxylic acids; anhydrides of such alicyclic polycarboxylic acids; esters of such alicyclic polycarboxylic acids with about $C_1$ to about $C_4$ lower alkyls; etc. Such alicyclic polybasic acids can be used singly or in a combination of two or more.

In view of the smoothness of the obtained coating film, examples of preferable alicyclic polybasic acids include 1,2-cyclohexanedicarboxylic acid, 1,2-cyclohexanedicarboxylic anhydride, 1,3-cyclohexanedicarboxylic acid, 1,4-cyclohexanedicarboxylic acid, 4-cyclohexene-1,2-dicarboxylic acid, and 4-cyclohexene-1,2-dicarboxylic anhydride. Among these, it is particularly preferable to use 1,2-cyclohexanedicarboxylic acid and/or 1,2-cyclohexanedicarboxylic anhydride.

Generally, aromatic polybasic acids include aromatic compounds having at least two carboxy groups per molecule; anhydrides of such aromatic compounds; and esters of such aromatic compounds. Examples of aromatic polybasic acids include phthalic acid, isophthalic acid, terephthalic acid, naphthalenedicarboxylic acid, 4,4'-biphenyldicarboxylic acid, trimellitic acid, pyromellitic acid, and like aromatic polycarboxylic acids; anhydrides of such aromatic polycarboxylic acids; esters of such aromatic polycarboxylic acids with about $C_1$ to about $C_4$ lower alkyls; etc. Such aromatic polybasic acids can be used singly or in a combination of two or more. Examples of preferable aromatic polybasic acids include phthalic acid, phthalic anhydride, isophthalic acid, trimellitic acid, and trimellitic anhydride.

Acid components other than aliphatic polybasic acids, alicyclic polybasic acids, and aromatic polybasic acids can also be used. Such other acid components are not particularly limited, and include, for example, coconut oil fatty acid, cottonseed oil fatty acid, hempseed oil fatty acid, rice bran oil fatty acid, fish oil fatty acid, tall oil fatty acid, soybean oil fatty acid, linseed oil fatty acid, tung oil fatty acid, rapeseed oil fatty acid, castor oil fatty acid, dehydrated castor oil fatty acid, safflower oil fatty acid, and like fatty acids; lauric acid, myristic acid, palmitic acid, stearic acid, oleic acid, linolic acid, linolenic acid, benzoic acid, p-tert-butyl benzoic acid, cyclohexanoic acid, 10-phenyloctadecanoic acid, and like monocarboxylic acids; lactic acid, 3-hydroxybutanoic acid, 3-hydroxy-4-ethoxybenzoic acid, and like hydroxycarboxylic acids. Such acid components can be used singly or in a combination of two or more.

Polyhydric alcohols having at least two hydroxy groups per molecule can be preferably used as the above-mentioned alcohol component. Examples of such polyhydric alcohols include ethylene glycol, propylene glycol, diethylene glycol, trimethylene glycol, tetraethylene glycol, triethylene glycol, dipropylene glycol, 1,4-butanediol, 1,3-butanediol, 2,3-butanediol, 1,2-butanediol, 3-methyl-1,2-butanediol, 2-butyl-2-ethyl-1,3-propanediol, 1,2-pentanediol, 1,5-pentanediol, 1,4-pentanediol, 2,4-pentanediol, 2,3-dimethyltrimethylene glycol, tetramethylene glycol, 3-methyl-4,3-pentanediol, 3-methyl-1,5-pentanediol, 2,2,4-trimethyl-1,3-pentanediol, 1,6-hexanediol, 1,5-hexanediol, 1,4-hexanediol, 2,5-hexanediol, neopentyl glycol, 1,4-cyclohexanedimethanol, tricyclodecanedimethanol, hydrogenated bisphenol A, hydrogenated bisphenol F, and like dihydric alcohols; polylactones diols obtained by adding lactones, such as ε-caprolactone, to such dihydric alcohols; bis(hydroxyethyl) terephthalate and like ester diols; alkylene oxide adducts of bisphenol A, polyethylene glycols, polypropylene glycols, polybutylene glycols, and like polyether diols; glycerol, trimethylolethane, trimethylolpropane, diglycerol, triglycerol, 1,2,6-hexanetriol, pentaerythritol, dipentaerythritol, tris(2-hydroxyethyl) isocyanuric acid, sorbitol, mannitol, and like trihydric or higher polyhydric alcohols; polylactone polyols obtained by adding lactones, such as ε-caprolactone, to such trihydric or higher polyhydric alcohols; etc.

Alcohol components other than the above-mentioned polyhydric alcohols can also be used. Such other alcohol components are not particularly limited, and include, for example, methanol, ethanol, propyl alcohol, butyl alcohol, stearyl alcohol, 2-phenoxyethanol, and like monohydric alcohols; alcohol compounds obtained by reacting, with acids, monoepoxy compounds such as propylene oxide, butylene oxide, "Cardura E10" (tradename of Hexion Specialty Chemicals; a glycidyl ester of a synthetic highly branched saturated fatty acid), and the like; etc.

The method for producing the hydroxy-containing polyester resin (A2) is not particularly limited, and may be a conventional method. For example, the hydroxy-containing polyester resin can be produced by heating the acid component and alcohol component in a nitrogen stream at about 150 to about 250° C. for about 5 to about 10 hours to thereby carry out an esterification reaction or transesterification reaction of the acid component with the alcohol component.

For the esterification reaction or transesterification reaction, the acid component and alcohol component may be added to a reaction vessel at one time, or one or both of the components may be added in several portions. Alternatively, a hydroxy-containing polyester resin may be first synthesized and then reacted with an acid anhydride for half-esterification to thereby obtain a carboxy- and hydroxy-containing polyester resin. Further alternatively, a carboxy-containing polyester resin may be first synthesized, and the above-mentioned alcohol component may be added to obtain a hydroxy-containing polyester resin.

For promoting the esterification or transesterification reaction, known catalysts are usable, including, for example, dibutyltin oxide, antimony trioxide, zinc acetate, manganese acetate, cobalt acetate, calcium acetate, lead acetate, tetrabutyl titanate, tetraisopropyl titanate, etc.

The hydroxy-containing polyester resin (A2) can be modified with a fatty acid, monoepoxy compound, polyisocyanate compound, or the like, during or after the preparation of the resin.

Examples of the fatty acid include coconut oil fatty acid, cottonseed oil fatty acid, hempseed oil fatty acid, rice bran oil fatty acid, fish oil fatty acid, tall oil fatty acid, soybean oil fatty acid, flaxseed oil fatty acid, tung oil fatty acid, rapeseed oil fatty acid, castor oil fatty acid, dehydrated castor oil fatty acid, safflower oil fatty acid, etc.

Preferable examples of the monoepoxy compound include "Cardura E10" (tradename of Hexion Specialty Chemicals; a glycidyl ester of a synthetic highly branched saturated fatty acid).

Examples of the polyisocyanate compound include lysine diisocyanate, hexamethylene diisocyanate, trimethylhexane diisocyanate, and like aliphatic diisocyanates; hydrogenated xylylene diisocyanate, isophorone diisocyanate, methylcyclohexane-2,4-diisocyanate, methylcyclohexane-2,6-diisocyanate, 4,4'-methylene bis(cyclohexylisocyanate), 1,3-(isocyanatomethyl)cyclohexane, and like alicyclic diisocyanates; tolylene diisocyanate, xylylene diisocyanate, diphenylmethane diisocyanate, and like aromatic diisocyanates; organic polyisocyanates, such as lysine triisocyanate and like tri- or higher polyisocyanates; adducts of such organic polyisocyanates with polyhydric alcohols, low-molecular-weight polyester resins, water, or the like; cyclopolymers (e.g., isocyanurate), biuret adducts, etc., of such organic polyisocyanates; etc. Such polyisocyanate compounds can be used singly or in a combination of two or more.

In view of the excellent smoothness and water resistance of the obtained coating film, the proportion of alicyclic polybasic acid is preferably about 30 to about 100 mol %, more preferably about 35 to about 95 mol %, and even more preferably about 40 to about 90 mol %, based on the total amount of acid component(s) used as starting materials to produce the hydroxy-containing polyester resin (A2). In view of the excellent smoothness of the obtained coating film, it is particularly preferable to use 1,2-cyclohexanedicarboxylic acid and/or 1,2-cyclohexanedicarboxylic anhydride as an alicyclic polybasic acid.

The hydroxy-containing polyester resin (A2) preferably has a hydroxy value of about 10 to about 200 mg KOH/g, more preferably about 30 to about 170 mg KOH/g, and even more preferably about 60 to about 160 mg KOH/g. When the hydroxy-containing polyester resin (A2) has a carboxy group, the resin (A2) preferably has an acid value of about 5 to about 150 mg KOH/g, more preferably about 10 to about 80 mg KOH/g, and even more preferably about 15 to about 60 mg KOH/g. The hydroxy-containing polyester resin (A2) preferably has a number average molecular weight of about 500 to about 50,000, more preferably about 1,000 to about 30,000, and even more preferably about 1,200 to about 10,000.

In this specification, the terms "number average molecular weight" and "weight average molecular weight" refer to values as determined using GPC ("HLC8120GPC", tradename of Tosoh Corporation) and expressed in terms of the molecular weight of standard polystyrene. More specifically, using four columns "TSKgel G-4000HXL", "TSKgel G-3000HXL", "TSKgel G-2500HXL", and "TSKgel G-2000HXL" (tradnames of Tosoh Corporation), the molecular weights were determined by an RI detector using tetrahydrofuran as the mobile phase at a temperature of 40° C. at a flow rate of 1 mL/min.

The proportion of the hydroxy-containing acrylic resin (A) in the aqueous base coating composition of the invention is preferably about 30 to about 95 mass %, more preferably about 50 to about 90 mass %, and even more preferably about 60 to about 80 mass %, based on the total mass of the hydroxy-containing resin (A) and the melamine resin (B) described below.

When the aqueous base coating composition of the invention comprises a water-dispersible acrylic resin (A1') as the hydroxy-containing resin (A), the proportion of the water-dispersible acrylic resin (A1') is preferably about 2 to about 70 mass %, more preferably about 10 to about 55 mass %, and even more preferably about 20 to about 45 mass %, based on the total amount of the hydroxy-containing resin (A) and the melamine resin (B).

When the aqueous base coating composition of the invention comprises a hydroxy-containing polyester resin (A2) as the hydroxy-containing resin (A), the proportion of the hydroxy-containing polyester resin (A2) is preferably about 2 to about 70 mass %, more preferably about 5 to about 55 mass %, and even more preferably about 10 to about 45 mass %, based on the total mass of the hydroxy-containing resin (A) and curing agent (B).

Melamine Resin (B)

The aqueous base coating composition of the invention contains a melamine resin (B) that has a weight average molecular weight of about 1,000 to about 5,000, preferably about 1,300 to about 4,000, and more preferably about 1,800 to about 3,000. Because the composition contains the melamine resin (B), the obtained coating film has excellent water resistance. The melamine resin (B) functions as a curing agent in the aqueous base coating composition of the invention.

The melamine resin (B) may be, for example, a partially or fully methylolated melamine resin obtained by reacting melamine with an aldehyde. Examples of aldehyde components include formaldehyde, paraformaldehyde, acetaldehyde, benzaldehyde, etc. Formaldehyde is particularly preferable.

Methylolated amino resins in which some or all of the methylol groups have been etherified with a suitable alcohol can also be used. Examples of alcohols that can be used for the etherification include methyl alcohol, ethyl alcohol, n-propyl alcohol, i-propyl alcohol, n-butyl alcohol, i-butyl alcohol, 2-ethylbutanol, 2-ethylhexanol, and like $C_{1-18}$ alcohols. $C_{1-4}$ alcohols such as methyl alcohol, ethyl alcohol, n-propyl alcohol, i-propyl alcohol, n-butyl alcohol, i-butyl alcohol, etc. are particularly preferable.

Particularly preferable as the melamine resin (B) are methyl-etherified melamine resins obtained by etherifying some or all of the methylol groups of a partially or fully methylolated melamine resin with methyl alcohol; butyl-etherified melamine resins obtained by etherifying some or all of the methylol groups of a partially or fully methylolated melamine resin with butyl alcohol; and methyl-butyl-etherified melamine resins obtained by etherifying some or all of the methylol groups of a partially or fully methylolated melamine resin with methyl alcohol and butyl alcohol. Among these, methyl-butyl-etherified melamine resins are preferable.

Such melamine resins (B) can be used singly or in a combination of two or more.

The proportion of the melamine resin (B) in the aqueous base coating composition of the invention is preferably about 5 to about 70 mass %, more preferably about 10 to about 50 mass %, and even more preferably about 20 to about 40 mass %, based on the total mass of the hydroxy-containing resin (A) and the melamine resin (B).

Diester Compound (C)

The aqueous base coating composition of the invention contains a diester compound represented by Formula (1)

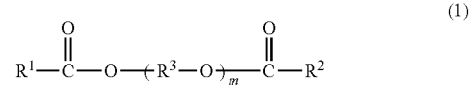

wherein $R^1$ and $R^2$ independently represent a $C_{4-18}$ hydrocarbon group, $R^3$ represents a $C_{2-4}$ alkylene group, m represents an integer of 3 to 25, and the $R^3$'s may be the same or different.

Because the composition contains the diester compound (C), the obtained coating film has excellent DOI, appearance, and water resistance.

The hydrocarbon group is preferably a $C_{5-11}$ alkyl group, more preferably $C_{5-9}$ alkyl group, and even more preferably $C_{6-8}$ alkyl group. In particular, when $R^1$ and $R^2$ are branched alkyl groups having 6 to 8 carbon atoms, the coating composition can form a coating film with excellent DOI even when applied after being stored for a comparatively long period of time.

The diester compound (C) can be obtained for example, by subjecting a polyoxyalkylene glycol having two terminal hydroxy groups and a $C_{4-18}$ hydrocarbon-containing monocarboxylic acid to an esterification reaction.

Examples of polyoxyalkylene glycols include polyethylene glycols, polypropylene glycols, copolymers of polyethylene and propylene glycol, polybutylene glycols, etc. Polyethylene glycols are particularly preferable. Such polyoxyalkylene glycols preferably have a weight average molecular weight of about 120 to about 1,200, more preferably about 150 to about 600, and even more preferably about 200 to about 400.

Examples of $C_{4-18}$ monocarboxylic acids include pentanoic acid, hexanoic acid, 2-ethylbutanoic acid, 3-methylpentanoic acid, benzoic acid, cyclohexane carboxylic acid, heptanoic acid, 2-ethylpentanoic acid, 3-ethylpentanoic acid, octanoic acid, 2-ethylhexanoic acid, 4-ethylhexanoic acid, nonanoic acid, 2-ethylheptanoic acid, decanoic acid, 2-ethyloctanoic acid, 4-ethyloctanoic acid, dodecanoic acid, hexadecanoic acid, octadecanoic acid, etc. Among these, hexanoic acid, heptanoic acid, 2-ethylpentanoic acid, 3-ethylpentanoic acid, octanoic acid, 2-ethylhexanoic acid, 4-ethylhexanoic acid, nonanoic acid, 2-ethylheptanoic acid, decanoic acid, 2-ethyloctanoic acid, 4-ethyloctanoic acid, and like $C_{5-9}$ alkyl-containing monocarboxylic acids are preferable, heptanoic acid, 2-ethylpentanoic acid, 3-ethylpentanoic acid, octanoic acid, 2-ethylhexanoic acid, 4-ethylhexanoic acid, nonanoic acid, 2-ethylheptanoic acid, and like $C_{6-8}$ alkyl-containing monocarboxylic acids are more preferable, and 2-ethylpentanoic acid, 3-ethylpentanoic acid, 2-ethylhexanoic acid, 4-ethylhexanoic acid, 2-ethylheptanoic acid, and like $C_{6-8}$ branched alkyl-containing monocarboxylic acids are even more preferable.

The diesterification reaction between a polyoxyalkylene glycol and monocarboxylic acid can be carried out according to a known method. Each of the polyoxyalkylene glycol and monocarboxylic acid can be used singly or in a combination of two or more. The diester compound (C) preferably has a molecular weight of about 320 to about 1,400, more preferably about 450 to about 1,000, even more preferably about 500 to about 800, and most preferably about 500 to about 700.

The proportion of the diester compound (C) in the aqueous base coating composition of the invention is preferably about 1 to about 30 parts by mass, more preferably about 3 to about 20 parts by mass, and even more preferably about 5 to about 15 parts by mass, based on 100 parts by mass of the total of the hydroxy-containing resin (A) and the melamine resin (B).

It is considered that the diester compound (C) contained in the coating composition enhances the compatibility of the melamine resin (B) with water, thereby providing a coating film with excellent DOI and suppressed metallic unevenness. In particular, when a coating film is formed by a two-coat one-bake method comprising applying the aqueous base coating composition of the invention to a substrate, applying a clear coating composition to the uncured base coating, and then heating to cure the coating of the invention and the clear coating at the same time, the obtained coating film has excellent DOI and suppressed metallic unevenness. This is presumably because the presence of the diester compound (C) near the interface between the base and clear coatings inhibits the formation of a mixed layer of the base coating and clear coating at the interface.

Other Components

The aqueous base coating composition of the invention may further contain a water-soluble or water-dispersible modifier resin having no hydroxy groups. Examples of such modifier resins include polyurethane resins, polyester resins, acrylic resins, alkyd resins, silicon resins, fluororesins, epoxy resins, etc. Such modifier resins can be used singly or in a combination of two or more. Water-soluble or water-dispersible polyurethane resins are particularly preferable in view of chipping resistance, water resistance, etc.

When the aqueous base coating composition of the invention contains such a modifier resin, the amount thereof is preferably about 50 parts by mass or less, and more preferably about 5 to about 40 parts by mass, based on 100 parts by mass of the total of the hydroxy-containing resin (A) and melamine resin (B).

When the hydroxy-containing resin (A) and/or the modifier resin have crosslinkable functional groups, such as carboxy, epoxy, etc., the aqueous base coating composition of the invention may further comprise a curing agent having crosslinkable functional groups that can react with the crosslinkable functional groups of the hydroxy-containing resin (A) and/or the modifier resin.

Examples of such curing agents include amino resins, polyisocyanate compounds, blocked polyisocyanate compounds, epoxy-containing compounds, carboxy-containing compounds, carbodiimide-containing compounds, etc. that can react with crosslinkable functional groups of the hydroxy-containing resin (A) and/or the modifier resin. It is particularly preferable to use a blocked polyisocyanate compound and/or a carbodiimide-containing compound as the curing agent.

Examples of usable blocked polyisocyanate compounds include compounds obtained by blocking isocyanate groups of a polyisocyanate compound having at least two isocyanate groups per molecule, with a blocking agent such as oxime, phenol, alcohols, lactam, mercaptan, etc.

Examples of usable carbodiimide-containing compounds include those obtained by subjecting isocyanate groups of a polyisocyanate compound to a carbon dioxide removal reaction. Commercially available carbodiimide-containing compounds include, for example, "Carbodilite V-02", "Carbodilite V-02-L2", "Carbodilite V-04", "Carbodilite E-01", and "Carbodilite E-02" (tradenames of Nisshinbo Industries, Inc.); and the like.

When the aqueous base coating composition contains such a curing agent, the amount of curing agent is preferably about 40 parts by mass or less, and more preferably about 5 to about 30 parts by mass, based on 100 parts by mass of the total of the hydroxy-containing resin (A) and melamine resin (B).

Preferably, the aqueous base coating composition of the invention further contains a hydrophobic solvent (D). The hydrophobic solvent (D) is preferably an organic solvent, the mass of which that dissolves in 100 g of water at 20° C. is 10 g or less, preferably 5 g or less, and more preferably 1 g or less. Examples of usable organic solvents include hydrocarbon solvents such as gasoline, mineral spirits, toluol, xylol, solvent naphtha, etc.; alcohol solvents such as n-hexanol, n-octanol, 2-octanol, 2-ethylhexanol, n-decanol, benzyl alcohol, ethylene glycol mono-2-ethylhexyl ether, propylene glycol mono-n-butyl ether, dipropylene glycol mono-n-butyl ether, tripropylene glycol mono-n-butyl ether, propylene glycol mono-2-ethylhexyl ether, propylene glycol monophenyl ether, etc.; ester solvents such as n-butyl acetate, isobutyl acetate, isoamyl acetate, methylamyl acetate, ethylene glycol acetate monobutyl ether, etc.; and ketone solvents such as methyl isobutyl ketone, cyclohexanone, ethyl n-amyl ketone, diisobutyl ketone, etc. Such solvents can be used singly or in a combination of two or more.

To suppress metallic unevenness, a hydrophobic alcohol solvent is preferably used as the hydrophobic solvent (D). Among such solvents, $C_{7-14}$ hydrophobic alcohol solvents are preferable, and it is more preferable to use at least one hydrophobic alcohol solvent selected from the group consisting of n-octanol, 2-octanol, 2-ethyl-1-hexanol, ethylene glycol mono-2-ethylhexyl ether, propylene glycol mono-n-butyl ether, and dipropylene glycol mono-n-butyl ether.

When the coating composition of the invention contains such a hydrophobic solvent (D), the amount of hydrophobic solvent (D) is preferably about 10 to about 100 parts by mass, more preferably about 20 to about 80 parts by mass, and even more preferably about 30 to about 60 parts by mass, based on 100 parts by mass of the total of the hydroxy-containing resin (A) and melamine resin (B).

The coating composition of the invention can further contain an effect pigment (E). The effect pigment (E) provides a coating film with excellent brilliance or iridescence, and may be any known pigment.

Examples of the effect pigment (E) include aluminium, evaporated aluminium, copper, zinc, brass, nickel, aluminium oxide, mica, aluminium oxide coated with titanium oxide or iron oxide, mica coated with titanium oxide or iron oxide, etc. Such effect pigments (E) can be used singly or in a combination of two or more. Aluminium and evaporated aluminium are particularly preferable as the effect pigment (E). There are two types of aluminium and evaporated aluminium, i.e., those of the non-leafing type and those of the leafing type, and either can be used herein.

The effect pigment (E) preferably has a scale-like shape. Preferably, such a scaly effect pigment (E) has a length in the longitudinal direction of about 1 to about 100 μm, particularly about 5 to about 40 μm, and a thickness of about 0.0001 to about 5 μm, particularly about 0.001 to about 2 Mm.

The amount of effect pigment (E) is preferably about 1 to about 60 parts by mass, more preferably about 5 to about 35 parts by mass, and even more preferably about 8 to about 20 parts by mass, based on 100 parts by mass of the total of the hydroxy-containing resin (A) and melamine resin (B).

If necessary, the aqueous coating composition of the invention may contain additives for coating compositions, such as coloring pigments, extender pigments, thickening agents, curing catalysts, UV absorbers, light stabilizers, antifoaming agents, plasticizers, organic solvents other than the above hydrophobic solvents, surface control agents, antisettling agents, etc. Such additives can be used singly or in a combination of two or more.

Examples of coloring pigments include titanium oxide, zinc white, carbon black, molybdenum red, Prussian blue, cobalt blue, azo pigments, phthalocyanine pigments, quinacridone pigments, isoindoline pigments, threne pigments, perylene pigments, etc.

Examples of extender pigments include talc, clay, kaolin, barium sulfate, barium carbonate, calcium carbonate, silica, alumina white, etc.

The coating composition of the invention is usually an aqueous color base coating composition comprising an effect pigment (E) and/or a coloring pigment.

Examples of thickening agents include inorganic thickening agents such as silicate, metal silicate, montmorillonite, colloidal alumina, etc.; polyacrylic acid thickening agents such as copolymers of (meth)acrylic acid and (meth)acrylic ester, sodium polyacrylate, etc.; associative thickening agents having a hydrophilic moiety and a hydrophobic moiety per molecule and capable of effectively improving the viscosity in an aqueous medium by adsorption of the hydrophobic moiety on the surface of pigments or emulsion particles in a coating composition or by association between hydrophobic moieties; cellulose derivative thickening agents such as carboxymethylcellulose, methylcellulose, hydroxyethylcellulose, etc.; protein thickening agents such as casein, sodium caseinate, ammonium caseinate, etc.; alginate thickening agents such as sodium alginate, etc.; polyvinyl thickening agents such as polyvinyl alcohol, polyvinylpyrrolidone, polyvinyl benzyl ether copolymers, etc.; polyether thickening agents such as pluronic polyether, polyether dialkyl ester, polyether dialkyl ether, polyether epoxy-modified products, etc.; maleic anhydride copolymer thickening agents such as partial esters of a copolymer of vinyl methyl ether and maleic anhydride, etc.; polyamide thickening agents such as polyamide amine salts, etc.; and the like. Such thickening agents can be used singly or in a combination of two or more.

Examples of usable polyacrylic acid thickening agents include commercially available products, which are available, for example, under the tradenames "PRIMAL ASE-60", "PRIMAL TT-615", and "PRIMAL RM-5", manufactured by Rohm and Haas; "SN thickener 613", "SN thickener 618", "SN thickener 630", "SN thickener 634", and "SN thickener 636", manufactured by San Nopco Ltd.; and the like. Examples of usable associative thickening agents include commercially available products, which are available, for example, under the tradenames "UH-420", "UH-450", "UH-462", "UH-472", "UH-540", "UH-752", "UH-756VF", and "UH-814N", manufactured by ADEKA Co. Ltd.; "PRIMAL RM-8W", "PRIMAL RM-825", "PRIMAL RM-2020NPR", "PRIMAL RM-12W", and "PRIMAL SCT-275", manufactured by Rohm and Haas; "SN thickener 612", "SN thickener 621N", "SN thickener 625N", "SN thickener 627N", and "SN thickener 660T", manufactured by San Nopco Ltd.; and the like.

As a thickening agent, it is preferable to use a polyacrylic acid thickening agent and/or an associative thickening agent, more preferably an associative thickening agent, and still more preferably a urethane associative thickening agent bearing a hydrophobic group at end(s) and having a urethane bond in a molecular chain. Examples of usable urethane associative thickening agents include commercially available products, which are available, for example, under the tradenames "UH-420", "UH-462", "UH-472", "UH-540", "UH-752", "UH-756VF", and "UH-814N", manufactured by ADEKA Co. Ltd.; "SN thickener 612", "SN thickener 621N", "SN thickener 625N", "SN thickener 627N", and "SN thickener 660T", manufactured by San Nopco Ltd.; and the like.

When the coating composition of the invention comprises a thickening agent as described above, the proportion thereof is preferably about 0.01 to about 10 parts by mass, more preferably about 0.05 to about 3 parts by mass, and still more preferably about 0.1 to about 2 parts by mass, per 100 parts by mass of the total solids of the coating composition.

Examples of curing catalysts include paratoluene sulfonic acid, dodecylbenzenesulfonic acid, dinonylnaphthalene sulfonic acid, and like sulfonic acids, salts of such sulfonic acids with amine, etc.

Preparation of Coating Composition

The aqueous base coating composition of the invention can be prepared by mixing and dispersing, in an aqueous medium, a hydroxy-containing resin (A), a melamine resin (B), and a diester compound (C), together with, if necessary, a hydrophobic solvent (D), an effect pigment (E), and other additives for coating compositions, using a known method. Examples of usable aqueous media include deionized water; hydrophilic organic solvents such as propylene glycol monomethyl ether, etc.; and the like.

It is usually preferable that the solids content of the coating composition of the invention be about 5 to about 40 mass %, more preferably about 15 to about 35 mass %, and still more preferably about 20 to about 30 mass %.

Method for Forming a Coating Film

The coating composition of the invention is applied to various substrates to form a metallic coating film with an excellent appearance.

Substrate

The substrate to be coated with the coating composition of the invention is not particularly limited. Examples of usable substrates include exterior panel parts of automotive bodies, such as passenger cars, trucks, motorcycles, buses, etc.; automotive components; exterior panel parts of household electric appliances, such as cellular phones, audiovisual apparatus, etc.; and the like. Exterior panel parts of automotive bodies and automotive components are especially preferable.

Materials for these substrates are not particularly limited. Examples thereof include metallic materials such as iron, aluminium, brass, copper, stainless steel, tin plate, galvanized steel, steels plated with zinc alloy (Zn—Al, Zn—Ni, Zn—Fe, etc.); plastic materials such as polyethylene resin, polypropylene resin, acrylonitrile-butadiene-styrene (ABS) resin, polyamide resin, acryl resin, vinylidene chloride resin, polycarbonate resin, polyurethane resin, epoxy resin, and like resins, various kinds of FRP, etc.; inorganic materials such as glass, cement, concrete, etc.; wood; textile materials (paper, cloth, etc.); and the like. Metallic materials and plastic materials are especially preferable.

The substrate may comprise a substrate material, such as a metallic material, and an undercoat film formed thereon. The substrate may comprise a substrate material coated with an undercoating and an intermediate coating in that order. When the substrate material is a metal, a surface-treatment with phosphate, chromate, composite oxide, etc. may be performed before forming an undercoat film on the substrate material.

The undercoat film is formed to impart anticorrosion properties, adhesion to the substrate material, hiding of the surface irregularities of the substrate material, etc. A known undercoat composition may be used to form such an undercoat film. For example, when the substrate material is a conductive material, such as metals, cationic electrodeposition coating compositions and anionic electrodeposition coating compositions are preferably used, and cationic electrodeposition coating compositions are particularly preferable. When the substrate material is a low-polarity material such as polypropylene, chlorinated polyolefin resin coating compositions and the like are preferably used.

After an undercoat composition is applied, the undercoating may be cured by heating, air-blowing, or some other appropriate means, or may be dried without causing curing. When a cationic electrodeposition coating composition or an anionic electrodeposition coating composition is used as an undercoat composition, the undercoating is preferably cured by heating after application of the undercoat composition, thus preventing the formation of a mixed layer between the undercoating and another coating formed thereon and providing a multilayer coating film with an excellent appearance.

The intermediate coating film is formed on the undercoat film to provide undercoat-topcoat adhesion, masking of the undercoat color, hiding of the undercoat surface irregularities, chipping resistance, etc.

The intermediate coating film can be formed by applying an intermediate coating composition. The intermediate coating film usually has a film thickness of about 10 to about 50 μm (when cured), preferably about 15 to about 30 μm (when cured).

The intermediate coating composition may be a known thermosetting intermediate coat composition. Examples of such intermediate coating compositions include those containing a base resin and a curing agent. Examples of base resins include alkyd resins, polyester resins, acrylic resins, urethane resins, etc. Examples of usable curing agents include compounds that can react with reactive functional groups of the base resin. Specific examples thereof include amino resins, polyisocyanate compounds, blocked polyisocyanate compounds, carbodiimide-containing compounds, etc. From the viewpoints of environmental problems, resources saving, etc., high-solid coating compositions using a small amount of organic solvent, aqueous coating compositions, powder coating compositions, etc. can be preferably used as the intermediate coating composition.

After the intermediate coating composition is applied, the intermediate coating can be cured, semi-cured, or dried to a set-to-touch state, by heating, air blowing, or some other appropriate means to effectively inhibit the formation of a mixed layer of the intermediate coating and a coating composition applied over the intermediate coating, and provide a multilayer coating film with an excellent appearance.

When an aqueous intermediate coating composition is used as the intermediate coating composition, in order to prevent coating defects such as foaming and cissing, it is preferable to perform preheating, air blowing, etc. under conditions in which the coating film does not substantially cure, after application of the intermediate composition. The preheating temperature is preferably about 40 to about 100° C., more preferably about 50 to about 90° C., and still more preferably about 60 to about 80° C. The preheating time is preferably about 30 seconds to about 15 minutes, more preferably about 1 to about 10 minutes, and still more preferably about 2 to about 5 minutes. Air blowing can usually be performed by blowing room temperature air or air heated to about 25 to about 80° C. over the coated surface of the substrate.

Coating Method

The method of applying the coating composition of the invention is not particularly limited. For example, air spray coating, airless spray coating, rotary atomization coating, curtain coating, and like application methods can be used. A wet coating film can be formed by such methods. Air spray coating, rotary atomization coating, and the like are especially preferable. Upon application of the coating composition, an electrostatic charge may be applied, if necessary.

Usually, the coating composition of the invention is preferably applied to a film thickness of about 5 to about 50 μm (when cured), more preferably about 5 to about 35 μm (when cured), and still more preferably about 8 to about 25 μm (when cured).

The wet coating can be cured by heating after application of the coating composition of the invention to a substrate. Heating can be performed by known heating means. For example, drying furnaces such as hot air furnaces, electric furnaces, infrared induction heating furnaces and the like can be used. The heating temperature is preferably about 80 to about 180° C., more preferably about 100 to about 170° C., and still more preferably about 120 to about 160° C. The heating temperature is not particularly limited, and is preferably about 10 to about 60 minutes, and more preferably about 20 to about 40 minutes.

In order to prevent coating defects such as foaming on the coated surface, after application of the coating composition of the invention, it is preferable to perform preheating, air blowing, etc., prior to heat-curing, under conditions in which the coating does not substantially cure. The preheating temperature is preferably about 40 to about 100° C., more preferably about 50 to about 90° C., and still more preferably about 60 to about 80° C. The preheating time is preferably about 30 seconds to about 15 minutes, more preferably about 1 to about 10 minutes, and still more preferably about 2 to about 5 minutes. Air blowing can be usually performed by blowing room temperature air or air heated to about 25 to about 80° C. over the coated surface of the substrate for about 30 seconds to about 15 minutes.

When a multilayer coating film comprising a base coating and a clear coating is formed on a substrate such as an automotive body by a two-coat one-bake method, the coating composition of the invention can be advantageously used to form a base coating. The formation of a coating film in this case can be performed in accordance with the following method I.

Method I

A method for forming a multilayer coating film comprising:

(1) a step of applying the coating composition of the invention to a substrate to form a base coating;

(2) a step of applying a clear coating composition to the uncured base coating surface to form a clear coating; and (3) a step of heating the uncured base coating and the uncured clear coating to cure both coatings at the same time.

A preferable example of the substrate in method I is an automotive body having an undercoat and/or an intermediate coat formed thereon. The "uncured coating" encompasses a set-to-touch coating and a semi-cured coating.

When the coating composition of the invention is applied by the above two-coat one-bake method I, the composition is preferably applied to a film thickness of about 5 to about 40 μm (when cured), more preferably about 10 to about 30 μm (when cured), and still more preferably about 10 to about 20 μm (when cured). The above clear coating composition is preferably applied to a film thickness of about 10 to about 80 μm (when cured), and more preferably about 15 to about 60 μm (when cured).

In method I, after application of the coating composition of the invention, in order to prevent coating defects such as foaming on the coated surface, it is preferable to perform preheating, air blowing, etc., under conditions in which the coating does not substantially cure. The preheating temperature is preferably about 40 to about 100° C., more preferably about 50 to about 90° C., and still more preferably about 60 to about 80° C. The preheating time is preferably about 30 seconds to about 15 minutes, more preferably about 1 to about 10 minutes, and still more preferably about 2 to about 5 minutes. Air blowing can be usually performed by blowing room temperature air or air heated to about 25 to about 80° C. over the coated surface of the substrate for about 30 seconds to about 15 minutes. After application of the clear coating composition, if necessary, it is possible to have an interval of about 1 to about 60 minutes at room temperature, or perform preheating at about 40 to about 80° C. for about 1 to about 60 minutes.

The above coating composition of the invention and clear coating composition can be cured using any of the above-described known heating means. The heating temperature is preferably about 80 to about 180° C., more preferably about 100 to about 170° C., and still more preferably about 120 to about 160° C. The heating time is preferably about 10 to about 60 minutes, and more preferably about 20 to about 40 minutes. This heating enables simultaneous curing of both coatings, i.e., a base coating and a clear coating.

When a multilayer coating film comprising an intermediate coating, a base coating, and a clear coating is formed on a substrate such as an automotive body by a three-coat one-bake method, the coating composition of the invention can be used to form the base coating. The formation of a coating film in this case can be performed in accordance with the following method II.

Method II

A method for forming a multilayer coating film comprising:

(1) a step of applying an intermediate coating composition to a substrate to form an intermediate coating;

(2) a step of applying the coating composition of the invention to the uncured intermediate coating surface to form a base coating;

(3) a step of applying a clear coating composition to the uncured base coating surface to form a clear coating; and (4) a step of heating the uncured intermediate coating, the uncured metallic base coating, and the uncured clear coating to simultaneously cure the coatings.

The above method II comprises performing method I to form a coating film on an uncured intermediate coating. A preferable example of the substrate in method II is an automotive body having an undercoat formed thereon.

In method II, usually, the intermediate coating composition is preferably applied to a film thickness of about 10 about 60 μm (when cured), and more preferably about 20 to about 40 μm (when cured). The coating composition of the invention is preferably applied to a film thickness of about 5 to about 40 μm (when cured), more preferably about 10 to about 30 μm (when cured), and still more preferably about 10 to about 20 μm (when cured). Usually, the clear coating composition is preferably applied to a film thickness of about 10 to about 80 μm (when cured), and more preferably about 15 to about 60 μm (when cured).

In method II, when an aqueous coating composition is used as an intermediate coating composition, preheating is preferably performed after application of the intermediate coating composition. The preheating temperature is preferably about room temperature to about 100° C., more preferably about 40 to about 90° C., and still more preferably about 60 to about 80° C. The preheating time is preferably about 30 seconds to about 15 minutes, more preferably about 1 to about 10 minutes, and still more preferably about 2 to about 5 minutes.

It is also preferable to perform preheating after application of the coating composition of the invention. The preheating temperature is preferably about room temperature to about 100° C., more preferably about 40 to about 90° C., and still more preferably about 60 to about 80° C. The preheating time is preferably about 30 seconds to about 15 minutes, more preferably about 1 to about 10 minutes, and still more preferably about 2 to about 5 minutes.

After application of the clear coating composition, if necessary, it is possible to have an interval of about 1 to about 60 minutes at room temperature, or perform preheating at about 40 to about 80° C. for about 1 to about 60 minutes.

The three coatings, i.e., uncured intermediate coating, uncured base coating, and uncured clear coating, can be heat cured using any of the above-described known heating means. The heating temperature is preferably about 80 to about 180° C., more preferably about 100 to about 170° C., and still more preferably about 120 to about 160° C. The heating time is preferably about 10 to about 60 minutes, and more preferably about 20 to about 40 minutes. This heating enables simultaneous curing of the three coating films, i.e., intermediate coating, base coating, and clear coating.

As the clear coating composition used in the above methods I and II, any known thermosetting clear coating compositions for coating an automotive body and the like can be used. Examples thereof include organic-solvent thermosetting coating compositions, aqueous thermosetting coating compositions, powder thermosetting coating compositions, which comprise a crosslinking agent and a base resin having a crosslinkable functional group.

Examples of crosslinkable functional groups contained in a base resin include carboxy, hydroxy, epoxy, silanol, and the like. Examples of the kind of base resins include acrylic resins, polyester resins, alkyd resins, urethane resins, epoxy resins, fluororesins, and the like. Examples of crosslinking agents include polyisocyanate compounds, blocked polyisocyanate compounds, melamine resins, urea resins, carboxy-containing compounds, carboxy-containing resins, epoxy-containing resins, epoxy-containing compounds, and the like.

The clear coating composition may be a one-pack coating composition, or a multi-pack coating composition such as a two-pack urethane resin coating composition.

If necessary, the clear coating composition may contain a coloring pigment, effect pigment, dye, etc., without impairing the transparency of the clear coating composition, and may also contain an extender pigment, UV absorber, light stabilizer, antifoaming agent, thickening agent, anticorrosive, surface control agent, etc.

Examples of preferable combinations of base resin/crosslinking agent for such a clear coating composition are carboxy-containing resin/epoxy-containing resin, hydroxy-containing resin/polyisocyanate compound, hydroxy-containing resin/blocked polyisocyanate compound, hydroxy-containing resin/melamine resin, and the like.

As an intermediate coating composition used in the above method II, any known thermosetting intermediate coating compositions can be used. Examples of thermosetting coating compositions preferably used are those containing a crosslinking agent, coloring pigment, and base resin having a crosslinkable functional group.

Examples of crosslinkable functional groups contained in the base resin include carboxy, hydroxy, epoxy, and the like. Examples of the kind of base resins include acrylic resins, polyester resins, alkyd resins, urethane resins and the like. Examples of usable crosslinking agents include melamine resins, polyisocyanate compounds, blocked polyisocyanate compounds, and the like.

The intermediate coating composition may be an organic solvent-based coating composition, aqueous coating composition, or powder coating composition. An aqueous coating composition is especially preferable.

In the above methods I and II, the intermediate coating composition and clear coating composition can be applied using known methods such as air spray coating, airless spray coating, rotary atomization coating, etc.

Effect of the Invention

The aqueous coating composition and method for forming a coating film using this composition according to the present invention can form a coating film with excellent DOI and excellent water resistance, and when the composition comprises an effect pigment, the obtained coating film has little metallic unevenness. In particular, when a coating film is formed by a two-coat one-bake method, the composition and method of the present invention can inhibit the formation of a mixed layer of a base coating and a clear coating to thereby provide a topcoat film with excellent DOI, water resistance, etc., and with little metallic unevenness.

BEST MODE FOR CARRYING OUT THE INVENTION

The present invention will be described in more detail below with reference to Preparation Examples, Examples and Comparative Examples. However, the present invention is not limited to the Examples. In these Examples, "parts" and "percent" are expressed on a mass basis, unless otherwise specified. Thickness of coating film are based on cured coating films.

Preparation of Hydroxy-Containing Acrylic Resin (A1)

Preparation Example 1

130 parts of deionized water and 0.52 parts of a polyoxyethylene-1-(allyloxymethyl)alkyl ether sulfate ammonium salt (tradename "Aqualon KH-10", manufactured by Dai-Ichi Kogyo Seiyaku Co., Ltd., active ingredient: 97%) were placed into a reaction vessel equipped with a thermometer, thermostat, stirrer, reflux condenser, nitrogen inlet tube and dropper. The mixture was stirred and mixed under a nitrogen stream and heated to 80° C.

A 1% portion of the total amount of monomer emulsion for a core copolymer described below and 5.3 parts of a 6% aqueous solution of ammonium persulfate were then introduced into the reaction vessel and the mixture was maintained at 80° C. for 15 minutes. The remainder of the monomer emulsion for the core copolymer was then added dropwise into the reaction vessel maintained at the same temperature, over a period of 3 hours. After the completion of the addition, the mixture was aged for 1 hour. A monomer emulsion for a shell copolymer described below was added dropwise over 1 hour, and the mixture was aged for 1 hour. While 40 parts of a 5% aqueous solution of 2-(dimethylamino)ethanol was gradually added into the reaction vessel, the mixture was cooled to 30° C. The reaction mixture was filtrated through a nylon cloth with a mesh size of 100 and the filtrate was collected, giving a water-dispersible hydroxy-containing acrylic resin dispersion (A1-1) having an average particle diameter of 100 nm, a solids content of 30%, an acid value of 33 mg KOH/g, and a hydroxy value of 25 mg KOH/g.

Monomer emulsion for the core copolymer: 42 parts of deionized water, 0.72 parts of "Aqualon KH-10", 2.1 parts of methylenebisacrylamide, 2.8 parts of styrene, 16.1 parts of methyl methacrylate, 28 parts of ethyl acrylate, and 21 parts of n-butyl acrylate were mixed and stirred, giving a monomer emulsion for the core copolymer.

Monomer emulsion for the shell copolymer: 18 parts of deionized water, 0.31 parts of "Aqualon KH-10" 0.03 parts of ammonium persulfate, 5.1 parts of methacrylic acid, 5.1 parts of 2-hydroxyethyl acrylate, 3 parts of styrene, 6 parts of methyl methacrylate, 1.8 parts of ethyl acrylate, and 9 parts of n-butyl acrylate were mixed and stirred, giving a monomer emulsion for the shell copolymer.

Preparation Examples 2 to 8

Water-dispersible hydroxy-containing acrylic resin dispersions (A1-2) to (A1-8) were obtained in a manner similar to that in Preparation Example 1 except that the starting materials and proportions thereof shown in Table 1 below were used.

Table 1 shows the starting material proportions (parts), solid contents (%), acid values (mg KOH/g), and hydroxy values (mg KOH/g) of the water-dispersible hydroxy-containing acrylic resin dispersions (A1-1) to (A1-8).

TABLE 1

| | | Preparation Example | | | | | | | |
|---|---|---|---|---|---|---|---|---|---|
| | | 1 | 2 | 3 | 4 | 5 | 6 | 7 | 8 |
| Name of hydroxy-containing acrylic resin | | A1-1 | A1-2 | A1-3 | A1-4 | A1-5 | A1-6 | A1-7 | A1-8 |
| Deionized water | | 130 | 130 | 130 | 130 | 130 | 130 | 130 | 130 |
| "Aqualon KH-10" | | 0.52 | 0.52 | 0.52 | 0.52 | 0.52 | 0.52 | 0.52 | 0.52 |
| 6% Ammonium persulfate aqueous solution | | 5.3 | 5.3 | 5.3 | 5.3 | 5.3 | 5.3 | 5.3 | 5.3 |
| Monomer emulsion for core copolymer | Deionized water | 42 | 42 | 42 | 42 | 42 | 42 | 42 | 42 |
| | "Aqualon KH-10" | 0.72 | 0.72 | 0.72 | 0.72 | 0.72 | 0.72 | 0.72 | 0.72 |
| | Methylene bisacrylamide | 2.1 | 2.1 | | 2.1 | 2.1 | 1.5 | 1.5 | |
| | Allyl methacrylate | | | 2.1 | | | 2.3 | | |
| | Acrylamide | | | | | | | | 2.1 |
| | Styrene | 2.8 | 2.8 | 2.8 | 2.8 | 2.8 | 5.3 | 6.8 | 2.8 |
| | Methyl methacrylate | 16.1 | 16.1 | 16.1 | 16.1 | 16.1 | 44 | 18 | 16.1 |
| | Ethyl acrylate | 28 | 28 | 28 | 28 | 28 | 11.3 | 26 | 28 |
| | n-Butyl acrylate | 21 | 21 | 21 | 21 | 21 | 10 | 22.5 | 21 |
| Monomer | Deionized water | 18 | 18 | 18 | 18 | 18 | 18 | 18 | 18 |

TABLE 1-continued

| | | Preparation Example | | | | | | | |
|---|---|---|---|---|---|---|---|---|---|
| | | 1 | 2 | 3 | 4 | 5 | 6 | 7 | 8 |
| emulsion for shell copolymer | "Aqualon KH-10" | 0.31 | 0.31 | 0.31 | 0.31 | 0.31 | 0.31 | 0.31 | 0.31 |
| | Ammonium persulfate | 0.03 | 0.03 | 0.03 | 0.03 | 0.03 | 0.03 | 0.03 | 0.03 |
| | Styrene | 3 | | 3 | | 3 | 3 | 2.3 | 3 |
| | 2-Ethylhexyl acrylate | | 3 | | | | 6 | | |
| | 2-hydroxyethyl acrylate | 5.1 | 5.1 | 5.1 | 5.1 | 5.1 | 2.3 | 2 | 5.1 |
| | Methacrylic acid | 5.1 | 5.1 | 5.1 | 5.1 | 5.1 | 3.3 | 4.3 | 5.1 |
| | Methyl methacrylate | 6 | 6 | 6 | 9 | 6 | 5 | 4.8 | 6 |
| | Ethyl acrylate | 1.8 | 1.8 | 1.8 | 1.8 | 1.8 | | 6.8 | 1.8 |
| | n-Butyl acrylate | 9 | 9 | 9 | 9 | 8 | 6 | 5 | 9 |
| | Allyl methacrylate | | | | | 1 | | | |
| 5% aqueous solution of 2-(dimethylamino) ethanol | | 40 | 40 | 40 | 40 | 40 | 40 | 40 | 40 |
| Solid content (%) | | 30 | 30 | 30 | 30 | 30 | 30 | 30 | 30 |
| Acid value (mg KOH/g) | | 33 | 33 | 33 | 33 | 33 | 22 | 28 | 33 |
| Hydroxy value (mg KOH/g) | | 25 | 25 | 25 | 25 | 25 | 11 | 10 | 25 |

In Table 1, methylene bisacrylamide and allyl methacrylate in the monomer emulsion for the core copolymer are polymerizable unsaturated monomers (b) having two or more polymerizable unsaturated groups per molecule. Styrene and 2-ethylhexyl acrylate in the monomer emulsion for the shell copolymer are hydrophobic polymerizable unsaturated monomers (d).

Among the hydroxy-containing acrylic resins (A1-1) to (A1-8), the resins (A1-1) to (A1-3) and (A1-5) to (A1-7) correspond to core-shell-type water-dispersible acrylic resins (A1').

Preparation Example 9

Thirty-five parts of propylene glycol monopropyl ether was placed into a reaction vessel equipped with a thermometer, thermostat, stirrer, reflux condenser, nitrogen inlet tube and dropper, and was heated to 85° C. A mixture of 30 parts of methyl methacrylate, 20 parts of 2-ethylhexyl acrylate, 29 parts of n-butyl acrylate, 15 parts of 2-hydroxyethyl acrylate, 6 parts of acrylic acid, 15 parts of propylene glycol monopropyl ether and 2.3 parts of 2,2'-azobis(2,4-dimethylvaleronitrile) was added dropwise over a period of 4 hours. After the completion of the addition, the mixture was aged for 1 hour. A mixture of 10 parts of propylene glycol monopropyl ether and 1 part of 2,2'-azobis(2,4-dimethylvaleronitrile) was added dropwise over a period of 1 hour. After the completion of the addition, the mixture was aged for 1 hour. Subsequently, 7.4 parts of diethanolamine was added, giving a hydroxy-containing acrylic resin solution (A1-9) with a solids content of 55%. The obtained hydroxy-containing acrylic resin had an acid value of 47 mg KOH/g, and a hydroxy value of 72 mg KOH/g.

Preparation of Hydroxy-Containing Polyester Resin (A2)

Preparation Example 10

109 parts of trimethylolpropane, 141 parts of 1,6-hexanediol, 126 parts of 1,2-cyclohexanedicarboxylic anhydride and 120 parts of adipic acid were placed in a reaction vessel equipped with a thermometer, thermostat, stirrer, reflux condenser and water separator. The mixture was heated from 160° C. to 230° C. over 3 hours, and subjected to a condensation reaction at 230° C. for 4 hours. Subsequently, to introduce a carboxy group into the obtained condensation reaction product, 38.3 parts of trimellitic anhydride was added and the mixture was allowed to react at 170° C. for 30 minutes. The reaction mixture was then diluted with ethylene glycol mono-2-ethylhexyl ether (the amount that dissolves in 100 g of water at 20° C., 0.5 g), giving a solution of hydroxy-containing polyester resin (A2-1) having a solids content of 70%. The obtained hydroxy-containing polyester resin had an acid value of 46 mg KOH/g, a hydroxy value of 150 mg KOH/g, and a number average molecular weight of 1,400. In the starting material proportions, the proportion of alicyclic polybasic acid in the acid components was 46 mol %, based on the total amount of the acid components.

Preparation Example 11

113 parts of trimethylolpropane, 131 parts of neopentyl glycol, 80 parts of 1,2-cyclohexanedicarboxylic acid anhydride, 93 parts of isophthalic acid, and 91 parts of adipic acid were placed into a reaction vessel equipped with a thermometer, thermostat, stirrer, reflux condenser, and water separator. The mixture was heated from 160° C. to 230° C. over 3 hours and subjected to a condensation reaction at 230° C. for 4 hours. Subsequently, to introduce carboxy groups into the obtained condensation reaction product, 33.5 parts of trimellitic anhydride was added and the mixture was allowed to react at 170° C. for 30 minutes. The reaction mixture was then diluted with ethylene glycol mono-2-ethylhexyl ether (the mass that dissolves in 100 g of water at 20° C., 0.5 g), giving a solution of a hydroxy-containing polyester resin (A2-2) having a solids content of 70%. The obtained hydroxy-containing polyester resin had an acid value of 40 mg KOH/g, a hydroxy value of 161 mg KOH/g, and a number average molecular weight of 1,300. In the starting material proportions, the proportion of alicyclic polybasic acid in the acid components was 28 mol %, based on the total amount of the acid components.

Preparation Example 12

A solution of a hydroxy-containing polyester resin (A2-3) was obtained in a manner similar to that in Preparation Example 10 except that ethylene glycol mono-n-butyl ether (the mass that dissolves in 100 g of water at 20° C.: unlimited) was used as a dilution solvent in place of ethylene glycol mono-2-ethylhexyl ether.

Preparation Example of Effect Pigment Dispersion

Preparation Example 13

In a stirring and mixing container, 19 parts of an aluminum pigment paste (tradename "GX-180A", manufactured by Asahi Kasei Metals, Ltd., aluminum content: 74%), 35 parts of ethylene glycol mono-2-ethylhexyl ether, 8 parts of a phosphoric acid group-containing resin solution described below, and 0.2 parts of 2-(dimethylamino)ethanol were uniformly mixed, giving an effect pigment dispersion (P1).

Phosphoric acid group-containing resin solution: A mixed solvent of 27.5 parts of methoxypropanol and 27.5 parts of isobutanol was placed into a reaction vessel equipped with a thermometer, thermostat, stirrer, reflux condenser, and dropper, and was heated to 110° C. While the mixture was maintained at 110° C., 121.5 parts of a mixture of 25 parts of styrene, 27.5 parts of n-butyl methacrylate, 20 parts of a branched higher alkyl acrylate (tradename "Isostearyl Acrylate", manufactured by Osaka Organic Chemical Industry, Ltd.), 7.5 parts of 4-hydroxybutyl acrylate, 15 parts of a phosphoric acid group-containing polymerizable monomer described below, 12.5 parts of 2-methacryloyloxyethyl acid phosphate, 10 parts of isobutanol, and 4 parts of t-butylperoxyoctanoate was added dropwise to the mixed solvent over a period of 4 hours. Subsequently, a mixture of 0.5 parts of t-butylperoxyoctanoate and 20 parts of isopropanol was added dropwise for 1 hour and then aged for 1 hour, thus giving a phosphoric acid group-containing resin solution with a solids content of 50%. The obtained phoshoric acid group-containing acrylic resin had an acid value of 83 mgKOH/g, a hydroxy value of 29 mgKOH/g, and a weight average molecular weight of 10,000.

Phosphoric acid group-containing polymerizable monomer: A reaction vessel equipped with a thermometer, thermostat, stirrer, reflux condenser, and dropper was loaded with a mixed solvent of 57.5 parts of monobutylphosphoric acid and 41 parts of isobutanol, and was heated to 90° C. After adding 42.5 parts of glycidyl methacrylate dropwise over a period of 2 hours, the mixture was aged for 1 hour. Subsequently, 59 parts of isopropanol was added, giving a phosphoric acid group-containing polymerizable monomer solution with a solids content of 50%. The obtained monomer had an acid value of 285 mgKOH/g.

Preparation Example 14

An effect pigment dispersion (P2) was prepared in a manner similar to that in Preparation Example 13 except that 35 parts of ethylene glycol mono-n-butyl ether was used in place of 35 parts of ethylene glycol mono-2-ethylhexyl ether.

Production of Aqueous Base Coating Composition

Example 1

One hundred parts of the hydroxy-containing acrylic resin dispersion (A1-1) obtained in Preparation Example 1, 57 parts of the hydroxy-containing polyester resin solution (A2-1) obtained in Preparation Example 10, 50 parts of melamine resin (B1) (a methyl-butyl-etherified melamine resin, solids content: 60%, weight average molecular weight: 2,000), 10 parts of a diester compound (C1) described below, and 62 parts of the effect pigment dispersion (P1) obtained in Preparation Example 13 were placed into a stirring and mixing container, and uniformly mixed. Deionized water and 2-(dimethylamino)ethanol were added thereto, giving an aqueous base coating composition (X1) having a pH of 8.0 and a solids content of 23%.

Diester compound (C1): a diester compound of polyoxyethylene glycol and n-hexanoic acid represented by Formula (1) wherein $R^1$ and $R^2$ are pentyl, and $R^3$ is ethylene, and m is 5. This diester compound has a molecular weight of 434.

Examples 2 to 22 and Comparative Examples 1 to 6

Aqueous base coating compositions (X2) to (X22) and (X32) to (X37) having a pH of 8.0 and a solids content of 23% were prepared in a manner similar to that in Example 1 except that the starting materials and proportions thereof shown in Table 2 below were used. The diester compounds (C2) to (C18) in Table 2 are as follows:

Diester compound (C2): a diester compound of polyoxyethylene glycol and 2-ethylbutanoic acid represented by Formula (1) wherein $R^1$ and $R^2$ are sec-butyl, $R^3$ is ethylene, and m is 7. This diester compound has a molecular weight of 522.

Diester compound (C3): a diester compound of polyoxyethylene glycol and 2-ethylpentanoic acid represented by Formula (1) wherein $R^1$ and $R^2$ are 2-ethylbutyl, $R^3$ is ethylene, and m is 7. This diester compound has a molecular weight of 536.

Diester compound (C4): a diester compound of polyoxyethylene glycol and benzoic acid represented by Formula (1) wherein $R^1$ and $R^2$ are benzene rings, $R^3$ is ethylene, and m is 7. This diester compound has a molecular weight of 536.

Diester compound (C5): a diester compound of polyoxyethylene glycol and n-octanoic acid represented by Formula (1) wherein $R^1$ and $R^2$ are heptyl, $R^3$ is ethylene, and m is 7. This diester compound has a molecular weight of 578.

Diester compound (C6): a diester compound of polyoxyethylene glycol and 2-ethylhexanoic acid represented by Formula (1) wherein $R^1$ and $R^2$ are 2-ethylpentyl, $R^3$ is ethylene, and m is 7. This diester compound has a molecular weight of 578.

Diester compound (C7): a diester compound of polyoxyethylene glycol and n-nonanoic acid represented by Formula (1) wherein $R^1$ and $R^2$ are octyl, $R^3$ is ethylene, and m is 7. This diester compound has a molecular weight of 606.

Diester compound (C8): a diester compound of polyoxyethylene glycol and 2-ethylheptanoic acid represented by Formula (1) wherein $R^1$ and $R^2$ are 2-ethylhexyl, $R^3$ is ethylene, and m is 7. This diester compound has a molecular weight of 606.

Diester compound (C9): a diester compound of polyoxyethylene glycol and n-decanoic acid represented by Formula (1) wherein $R^1$ and $R^2$ are nonyl, $R^3$ is ethylene, and m is 7. This diester compound has a molecular weight of 634.

Diester compound (C10): a diester compound of polyoxyethylene glycol and 2-ethyloctanoic acid represented by Formula (1) wherein $R^1$ and $R^2$ are 2-ethylheptyl, $R^3$ is ethylene, and m is 10. This diester compound has a molecular weight of 766.

Diester compound (C11): a diester compound of polyoxyethylene glycol and n-dodecanoic acid represented by Formula (1) wherein $R^1$ and $R^2$ are undecyl, $R^3$ is ethylene, and m is 7. This diester compound has a molecular weight of 690.

Diester compound (C12): a diester compound of polyoxyethylene glycol and n-octadecanoic acid represented by Formula (1) wherein $R^1$ and $R^2$ are heptadecyl, $R^3$ is ethylene, and m is 7. This diester compound has a molecular weight of 858.

Diester compound (C13): a diester compound of polyoxyethylene glycol and 2-ethylhexanoic acid represented by Formula (1) wherein $R^1$ and $R^2$ are 2-ethylpentyl, $R^3$ is ethylene, and m is 3. This diester compound has a molecular weight of 402.

Diester compound (C14): a diester compound of polyoxyethylene glycol and 2-ethylhexanoic acid represented by Formula (1) wherein $R^1$ and $R^2$ are 2-ethylpentyl, $R^3$ is ethylene, and m is 5. This diester compound has a molecular weight of 490.

Diester compound (C15): a diester compound of polyoxyethylene glycol and 2-ethylhexanoic acid represented by Formula (1) wherein $R^1$ and $R^2$ are 2-ethylpentyl, $R^3$ is ethylene, and m is 10. This diester compound has a molecular weight of 710.

Diester compound (C16): A diester compound of polyoxyethylene glycol and 2-ethylhexanoic acid represented by Formula (1) wherein $R^1$ and $R^2$ are 2-ethylpentyl, $R^3$ is ethylene, and m is 25. This diester compound has a molecular weight of 1,370.

Diester compound (C17): A diester compound of polyoxyethylene glycol and n-butanoic acid represented by Formula (1) wherein $R^1$ and $R^2$ are n-propyl, $R^3$ is ethylene, and m is 7. This diester compound has a molecular weight of 466.

Diester compound (C18): A diester compound of polyoxyethylene glycol and n-icosanoic acid represented by Formula (1) wherein $R^1$ and $R^2$ are nonadecyl, $R^3$ is ethylene, and m is 7. This diester compound has a molecular weight of 914.

Example 23

100 parts of the hydroxy-containing acrylic resin dispersion (A1-1) obtained in Preparation Example 1, 18 parts of the hydroxy-containing acrylic resin solution (A1-9) obtained in Preparation Example 9, 43 parts of the hydroxy-containing polyester resin solution (A2-1) obtained in Preparation Example 10, 50 parts of a melamine resin (B1) (a methyl-butyl-etherified melamine resin, solids content: 60%, weight average molecular weight: 2,000), 10 parts of the diester compound (C6), and 62 parts of the effect pigment dispersion (P1) obtained in Preparation Example 13 were placed into a stirring and mixing container, and uniformly mixed. Deionized water and 2-(dimethylamino)ethanol were added to the mixture, giving an aqueous base coating composition (X23) having a pH of 8.0 and a solids content of 23%.

Examples 24 to 29

Aqueous base coating compositions (X24) to (X29) having a pH of 8.0 and a solids content of 23% were prepared in a manner similar to that in Example 23 except that the starting materials and proportions thereof shown in Table 2 below were used.

Example 30

110 parts of the hydroxy-containing acrylic resin dispersion (A1-1) obtained in Preparation Example 1, 20 parts of the hydroxy-containing acrylic resin solution (A1-9) obtained in Preparation Example 9, 37 parts of the hydroxy-containing polyester resin solution (A2-1) obtained in Preparation Example 10, 50 parts of a melamine resin (B1) (a methyl-butyl-etherified melamine resin, solids content: 60%, weight average molecular weight: 2,000), 10 parts of the diester compound (C6), and 62 parts of the effect pigment dispersion (P1) obtained in Preparation Example 13 were placed into a stirring and mixing container, and uniformly mixed. A urethane associative thickening agent (tradename "UH-752", manufactured by ADEKA Co., Ltd.), 2-(dimethylamino)ethanol, and deionized water were added, giving an aqueous base coating composition (X30) having a pH of 8.0, a solids content of 23%, and a viscosity of 40 seconds as measured at 20° C. using Ford Cup No. 4.

Example 31

110 parts of the hydroxy-containing acrylic resin dispersion (A1-1) obtained in Preparation Example 1, 20 parts of the hydroxy-containing acrylic resin solution (A1-9) obtained in Preparation Example 9, 37 parts of the hydroxy-containing polyester resin solution (A2-1) obtained in Preparation Example 10, 50 parts of a melamine resin (B1) (a methyl-butyl-etherified melamine resin, solids content: 60%, weight average molecular weight: 2,000), 10 parts of the diester compound (C6), and 62 parts of the effect pigment dispersion (P1) obtained in Preparation Example 13 were placed into a stirring and mixing container, and a polyacrylic acid thickener (tradename "PRIMAL ASE-60", manufactured by Rohm and Haas Co.), 2-(dimethylamino)ethanol, and deionized water were added to the mixture, giving an aqueous base coating composition (X31) having a pH of 8.0, a solid content of 21%, and a viscosity of 40 seconds as measured at 20° C. using Ford Cup No. 4.

Table 2 shows the proportions of the components of the aqueous base coating compositions obtained in Examples 1 to 31 and Comparative Examples 1 to 6.

TABLE 2

| | | Example | | | | | | | | | |
|---|---|---|---|---|---|---|---|---|---|---|---|
| | | 1 | 2 | 3 | 4 | 5 | 6 | 7 | 8 | 9 | 10 |
| Aqueous base coating composition | | X1 | X2 | X3 | X4 | X5 | X6 | X7 | X8 | X9 | X10 |
| Hydroxy-containing acrylic resin (A1) | Kind | A1-1 | A1-1 | A1-1 | A1-1 | A1-1 | A1-1 | A1-1 | A1-1 | A1-1 | A1-1 |
| | Amount | 100 | 100 | 100 | 100 | 100 | 100 | 100 | 100 | 100 | 100 |
| Hydroxy-containing polyester resin (A2) | Kind | A2-1 | A2-1 | A2-1 | A2-1 | A2-1 | A2-1 | A2-1 | A2-1 | A2-1 | A2-1 |
| | Amount | 57 | 57 | 57 | 57 | 57 | 57 | 57 | 57 | 57 | 57 |
| Melamine resin (B) | Kind | B1 | B1 | B1 | B1 | B1 | B1 | B1 | B1 | B1 | B1 |
| | Amount | 50 | 50 | 50 | 50 | 50 | 50 | 50 | 50 | 50 | 50 |
| Diester | Kind | C1 | C2 | C3 | C4 | C5 | C6 | C7 | C8 | C9 | C10 |

TABLE 2-continued

| | | Example | | | | | | | | |
|---|---|---|---|---|---|---|---|---|---|---|
| | | | 11 | 12 | 13 | 14 | 15 | 16 | 17 | 18 | 19 |
| compound (C) | Amount | 10 | 10 | 10 | 10 | 10 | 10 | 10 | 10 | 10 | 10 |

| | | Example | | | | | | | | |
|---|---|---|---|---|---|---|---|---|---|---|
| | | 11 | 12 | 13 | 14 | 15 | 16 | 17 | 18 | 19 |
| Aqueous base coating composition | | X11 | X12 | X13 | X14 | X15 | X16 | X17 | X18 | X19 |
| Hydroxy-containing acrylic resin (A1) | Kind | A1-1 | A1-1 | A1-1 | A1-1 | A1-1 | A1-1 | A1-1 | A1-2 | A1-3 | A1-4 |
| | Amount | 100 | 100 | 100 | 100 | 100 | 100 | 100 | 100 | 100 | 100 |
| Hydroxy-containing polyester resin (A2) | Kind | A2-1 | A2-1 | A2-1 | A2-1 | A1-1 | A2-2 | A2-1 | A2-1 | A2-1 |
| | Amount | 57 | 57 | 57 | 57 | 57 | 57 | 57 | 57 | 57 |
| Melamine resin (B) | Kind | B1 | B1 | B1 | B1 | B1 | B1 | B1 | B1 | B1 |
| | Amount | 50 | 50 | 50 | 50 | 50 | 50 | 50 | 50 | 50 |
| Diester compound (C) | Kind | C11 | C12 | C13 | C14 | C15 | C16 | C6 | C6 | C6 |
| | Amount | 10 | 10 | 10 | 10 | 10 | 10 | 10 | 10 | 10 |

| | | Example | | | | | | |
|---|---|---|---|---|---|---|---|---|
| | | 20 | 21 | 22 | 23 | 24 | 25 | 26 |
| Aqueous base coating composition | | X20 | X21 | X22 | X23 | X24 | X25 | X26 |
| Hydroxy-containing acrylic resin (A1) | Kind | A1-1 | A1-1 | A1-1 | A1-1 | A1-1 | A1-5 | A1-6 |
| | Amount | 100 | 100 | 93 | 100 | 110 | 110 | 110 |
| | Kind | — | — | — | A1-9 | A1-9 | A1-9 | A1-9 |
| | Amount | — | — | — | 18 | 20 | 20 | 20 |
| Hydroxy-containing polyester resin (A2) | Kind | A2-1 | A2-3 | A2-1 | A2-1 | A2-1 | A2-1 | A2-1 |
| | Amount | 57 | 57 | 53 | 43 | 37 | 37 | 37 |
| Melamine resin (B) | Kind | B2 | B1 | B1 | B1 | B1 | B1 | B1 |
| | Amount | 38 | 50 | 58 | 50 | 50 | 50 | 50 |
| Diester compound (C) | Kind | C6 | C6 | C6 | C6 | C6 | C6 | C6 |
| | Amount | 10 | 10 | 8 | 10 | 10 | 10 | 10 |

| | | Example | | | | |
|---|---|---|---|---|---|---|
| | | 27 | 28 | 29 | 30 | 31 |
| Aqueous base coating composition | | X27 | X28 | X29 | X30 | X31 |
| Hydroxy-containing acrylic resin (A1) | Kind | A1-7 | A1-8 | A1-1 | A1-1 | A1-1 |
| | Amount | 110 | 110 | 110 | 110 | 110 |
| | Kind | A1-9 | A1-9 | A1-9 | A1-9 | A1-9 |
| | Amount | 20 | 20 | 20 | 20 | 20 |
| Hydroxy-containing polyester resin (A2) | Kind | A2-1 | A2-1 | A2-2 | A2-1 | A2-1 |
| | Amount | 37 | 37 | 37 | 37 | 37 |
| Melamine resin (B) | Kind | B1 | B1 | B1 | B1 | B1 |
| | Amount | 50 | 50 | 50 | 50 | 50 |
| Diester compound (C) | Kind | C6 | C6 | C6 | C6 | C6 |
| | Amount | 10 | 10 | 10 | 10 | 10 |

| | | Comparative Example | | | | | |
|---|---|---|---|---|---|---|---|
| | | 1 | 2 | 3 | 4 | 5 | 6 |
| Aqueous base coating composition | | X32 | X33 | X34 | X35 | X36 | X37 |
| Hydroxy-containing acrylic resin (A1) | Kind | A1-1 | A1-1 | A1-1 | A1-1 | A1-1 | A1-1 |
| | Amount | 100 | 100 | 100 | 100 | 100 | 100 |
| Hydroxy-containing polyester resin (A2) | Kind | A2-1 | A2-1 | A2-1 | A2-1 | A2-1 | A2-1 |
| | Amount | 57 | 57 | 57 | 57 | 57 | 57 |
| Melamine resin (B) | Kind | B1 | B1 | B1 | B1 | B1 | B3 |
| | Amount | 50 | 50 | 50 | 50 | 50 | 38 |
| Diester | Kind | — | — | — | C17 | C18 | C6 |

TABLE 2-continued

| compound (C) | Amount | — | — | — | 10 | 10 | 10 |
| Polyol A | Amount | — | 10 | — | — | — | — |
| Polyol B | Amount | — | — | 10 | — | — | — |

In Table 2, Polyol A, Polyol B, melamine resin (B2), and melamine resin (B3) are as follows:
Polyol A: polyethylene glycol, solids content; 100%, hydroxy value; 187 mg KOH/g, number average molecular weight; about 600
Polyol B: polyester polyol, solids content; 100%, hydroxy value; 235 mg KOH/g, number average molecular weight; about 480
Melamine resin (B2): a methyl-butyl-etherified melamine resin, solids content; 80%, weight average molecular weight; 1,300
Melamine resin (B3): a methyl etherified melamine resin, solids content; 80%, weight average molecular weight; 800

Preparation of Substrates

Preparation Example 15

A thermosetting epoxy resin cationic electrodeposition coating composition (tradename "Electron GT-10", manufactured by Kansai Paint Co., Ltd.) was applied by electrodeposition to zinc phosphate-treated cold-rolled steel plates to a film thickness of 20 μm, and cured by heating at 170° C. for 30 minutes. Subsequently, an intermediate coating composition (tradename "Amilac TP-65-2", manufactured by Kansai Paint Co., Ltd., a polyester resin/amino resin organic solvent-based coating composition) was applied to this electrodeposition coating film to a film thickness of 35 μm, and cured by heating at 140° C. for 30 minutes. Substrates comprising a steel plate and an electrodeposition coating film and an intermediate coating film formed on the steel plate were thus prepared.

Method of Forming Coating Films

Example 32

A multilayer coating film comprising a base coating and a clear coating on a substrate was formed by using the aqueous base coating composition (X1) obtained in Example 1 as a base coating composition in the above two-coat one-bake method I for forming a multilayer coating film.

More specifically, the aqueous base coating composition (X1) was applied to the substrate obtained in Preparation Example 15 to a film thickness of 15 μm using a rotary atomizer, then allowed to stand for 2 minutes, and preheated at 80° C. for 3 minutes. Subsequently, an acrylic resin organic solvent-based clear topcoat composition (tradename "Magicron KINO-1210", manufactured by Kansai Paint Co., Ltd.) was applied to the uncured coating surface to a film thickness of 40 μm, then allowed to stand for 7 minutes, and heated at 140° C. for 30 minutes to cure both coatings at the same time. A test plate consisting of a substrate and a multilayer coating film comprising a base coating and a clear coating formed thereon was thus obtained.

Examples 33 to 62 and Comparative Examples 7 to 12

Test plates of Examples 33 to 62 and Comparative Examples 7 to 12 were obtained in a manner similar to that in Example 32 except that the aqueous base coating compositions shown in Table 3 were used in place of the aqueous base coating composition (X1) used in Example 32.

Evaluation Tests

The multilayer coating films of the test plates obtained in Examples 32 to 62 and Comparative Examples 7 to 12 described above were tested in their coating film performance, in terms of DOI (distinctness of image), appearance, and water resistance. The test methods are as follows:

DOI: DOI was evaluated, based on the Short Wave (SW) value determined by "Wave Scan" (tradename of BYK-Gardner GmbH). The SW value is an index expressed in terms of the amplitude of wavelengths of about 300 to about 1,200 μm. The lower the measurement value, the higher the DOI of the coating film surface.

The "initial" in Table 3 refers to the DOI of the coating film formed by applying an aqueous base coating composition immediately after the preparation of the composition. The "post-storage" refers to the DOI of the coating film formed by applying an aqueous base coating composition having been stored at 30° C. for 30 days after the preparation of the composition.

Appearance: The multilayer coating film of each test plate was observed with the naked eye, and the appearance was evaluated according to the following criteria:
A: Substantially no metallic unevenness was observed, and the coating film has an extremely excellent appearance.
B: A small amount of metallic unevenness was observed, but the coating film has an excellent appearance.
C: A considerable amount of metallic unevenness was observed, and the coating film has a poor appearance.

Water resistance: Each test piece was immersed in 40° C. warm water for 240 hours and then removed and dried for 12 hours. Subsequently, crosscuts reaching the substrate were made in the multilayer coating film on the test plate using a cutter knife to form a grid of 100 squares (2 mm×2 mm). Subsequently, an adhesive cellophane tape was applied to the surface of the crosscut coating film and abruptly peeled off at 20° C. The remainability of the crosscut coating film squares was then checked. The water resistance was evaluated according to the following criteria:
A: 100 squares remained, and no edge chipping occurred.
B: 100 squares remained, but edge chipping occurred.
C: 90 to 99 squares remained.
D: The number of remaining squares was 89 or less.
Table 3 shows the results of the evaluation tests.

TABLE 3

| | Example | | | | | | | |
| --- | --- | --- | --- | --- | --- | --- | --- | --- |
| | 32 | 33 | 34 | 35 | 36 | 37 | 38 | 39 |
| Aqueous base coating composition | X1 | X2 | X3 | X4 | X5 | X6 | X7 | X8 |
| DOI (Initial) | 10.7 | 9.1 | 6.7 | 7.2 | 5.3 | 5.1 | 6.5 | 6.3 |
| DOI (Post-storage) | 14.5 | 11.4 | 8.5 | 10.1 | 9.6 | 7.2 | 9.9 | 8.4 |
| Appearance | A | A | B | B | A | A | A | A |
| Water | B | A | A | A | A | A | A | A |

TABLE 3-continued resistance

| | Example | | | | | | | |
|---|---|---|---|---|---|---|---|---|
| | 40 | 41 | 42 | 43 | 44 | 45 | 46 | 47 |
| Aqueous base coating composition | X9 | X10 | X11 | X12 | X13 | X14 | X15 | X16 |
| DOI (Initial) | 7.3 | 8.9 | 10.9 | 12.9 | 11.2 | 6.4 | 9.2 | 13.0 |
| DOI (Post-storage) | 11.7 | 11.2 | 13.8 | 14.8 | 13.3 | 8.3 | 11.1 | 14.8 |
| Appearance | B | B | B | B | B | B | B | B |
| Water resistance | A | A | B | B | B | A | B | B |

| | Example | | | | | | | |
|---|---|---|---|---|---|---|---|---|
| | 48 | 49 | 50 | 51 | 52 | 53 | 54 | 55 |
| Aqueous base coating composition | X17 | X18 | X19 | X20 | X21 | X22 | X23 | X24 |
| DOI (Initial) | 6.9 | 9.1 | 10.9 | 5.6 | 7.1 | 5.8 | 5.2 | 5.3 |
| DOI (Post-storage) | 9.2 | 11.3 | 13.1 | 7.7 | 9.1 | 8.0 | 7.2 | 7.4 |
| Appearance | B | B | B | A | B | A | A | A |
| Water resistance | A | A | B | B | A | A | A | A |

| | Example | | | | | | |
|---|---|---|---|---|---|---|---|
| | 56 | 57 | 58 | 59 | 60 | 61 | 62 |
| Aqueous base coating composition | X25 | X26 | X27 | X28 | X29 | X30 | X31 |
| DOI (Initial) | 7.9 | 7.1 | 5.2 | 10.5 | 5.6 | 5.1 | 5.2 |
| DOI (Post-storage) | 9.8 | 9.3 | 7.3 | 12.6 | 8.0 | 7.1 | 7.3 |
| Appearance | B | B | A | B | A | A | A |
| Water resistance | A | A | B | B | A | A | A |

| | Comparative Example | | | | | |
|---|---|---|---|---|---|---|
| | 7 | 8 | 9 | 10 | 11 | 12 |
| Aqueous base coating composition | X24 | X25 | X26 | X27 | X28 | X29 |
| DOI (Initial) | 20.1 | 22.4 | 20.5 | 19.8 | 25.2 | 10.1 |
| DOI (Post-storage) | 21.7 | 23.6 | 25.2 | 24.4 | 28.2 | 12.5 |
| Appearance | C | C | C | C | C | B |
| Water resistance | B | D | D | B | C | D |

The invention claimed is:

1. An aqueous base coating composition comprising
(A) a hydroxy-containing resin,
(B) a melamine resin with a weight average molecular weight of 1,000 to 5,000, and
(C) a diester compound represented by Formula (1)

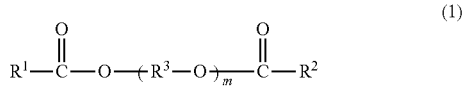

(1)

wherein $R^1$ and $R^2$ are 2-ethylpentyl, $R^3$ is ethylene, and m is 7;
wherein the hydroxy-containing resin (A) comprises a core-shell-type water-dispersible acrylic resin (A1'), a hydroxy-containing acrylic resin (A1) other than a core-shell-type water-dispersible acrylic resin (A1'), and a hydroxy-containing polyester resin (A2); the core-shell-type water-dispersible acrylic resin (A1') comprises:

a core copolymer (I) made by polymerizing monomers consisting of 0.1 to 30 mass % of one or more polymerizable unsaturated monomers (b) having two or more polymerizable unsaturated groups selected from the group consisting of vinyl and (meth)acryloyl per molecule, and 70 to 99.9 mass % of one or more polymerizable unsaturated monomers (c) having one polymerizable unsaturated group per molecule as monomer components; and a shell copolymer (II) made by polymerizing monomers consisting of 1 to 35 mass % of one or more hydroxy-containing polymerizable unsaturated monomers (a) having one or more polymerizable unsaturated groups selected from the group consisting of vinyl and (meth)acryloyl, 5 to 60 mass % of one or more hydrophobic polymerizable unsaturated monomers (d) having one or more polymerizable groups selected from the group consisting of vinyl and (meth)acryloyl, and 5 to 94 mass % of other polymerizable unsaturated monomer(s) (e) having one or more polymerizable unsaturated groups selected from the group consisting of vinyl and (meth)acryloyl as monomer components;

the solids mass ratio of copolymer (I) to copolymer (II) is in the range of 10/90 to 90/10 the proportion of the water-dispersible acrylic resin (A1') is about 10 to about 55 mass % based on the total amount of the hydroxy-containing resin (A) and the melamine resin (B);

the proportion of the hydroxy-containing polyester resin (A2) is about 10 to about 45 mass % based on the total mass of the hydroxy-containing resin (A) and melamine resin (B); and the proportion of the diester compound (C) in the aqueous base coating composition is about 5 to about 15 parts by mass, based on 100 parts by mass of the total of the hydroxy-containing resin (A) and the melamine resin (B);

the one or more hydrophobic polymerizable unsaturated monomers (d) comprise one or more $C_{6-18}$ alkyl-containing polymerizable unsaturated monomers and/or one or more aromatic ring-containing polymerizable unsaturated monomers.

2. The aqueous base coating composition according to claim 1 wherein the polymerizable unsaturated monomer (b) is an amide group-containing monomer.

3. The aqueous base coating composition according to claim 1 wherein the mass ratio of the hydroxy-containing resin (A) to the melamine resin (B) is in the range of 30:70 to 95:5.

4. The aqueous base coating composition according to claim 1 further comprising a hydrophobic solvent (D).

5. The aqueous base coating composition according to claim 1 further comprising an effect pigment (E).

6. An article coated with the aqueous base coating composition of claim 1.

7. A method for forming a multilayer coating film comprising:
(1) a step of applying the aqueous base coating composition of claim 1 to a substrate to form a base coating;
(2) a step of applying a clear coating composition to the uncured base coating surface to form a clear coating;
(3) a step of heating the uncured base coating and the uncured clear coating to cure the coatings at the same time.

8. An article coated using the method of claim 7.

* * * * *